United States Patent
Zhao et al.

(10) Patent No.: US 9,841,908 B1
(45) Date of Patent: Dec. 12, 2017

(54) DECLUSTERED ARRAY OF STORAGE DEVICES WITH CHUNK GROUPS AND SUPPORT FOR MULTIPLE ERASURE SCHEMES

(71) Applicant: Western Digital Technologies, Inc., Irvine, CA (US)

(72) Inventors: Zhengyi Zhao, Singapore (SG); Jun Xu, Singapore (SG)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 15/198,245

(22) Filed: Jun. 30, 2016

(51) Int. Cl.
G06F 12/00 (2006.01)
G06F 3/06 (2006.01)
G06F 11/14 (2006.01)
G06F 11/10 (2006.01)
(Continued)

(52) U.S. Cl.
CPC .......... G06F 3/0611 (2013.01); G06F 3/0619 (2013.01); G06F 3/0644 (2013.01); G06F 3/0683 (2013.01); G06F 11/1088 (2013.01); G06F 11/1469 (2013.01); G06F 2201/84 (2013.01)

(58) Field of Classification Search
CPC .... G06F 3/0611; G06F 3/0619; G06F 3/0644; G06F 3/0683; G06F 11/1469; G06F 11/1088; G06F 2201/84
See application file for complete search history.

(56) References Cited

U.S. PATENT DOCUMENTS 6,038,570 A    3/2000   Hitz et al.
6,330,642 B1  12/2001   Carteau
7,000,162 B2   2/2006   Bernstein et al.
(Continued)

OTHER PUBLICATIONS

Amer, Ahmed et al. "Data management and layout for shingled magnetic recording" IEEETransaction on Magnetics, vol. 47, issue 10, pp. 3691-3697, Oct. 2011.
(Continued)

*Primary Examiner* — Mark Giardino, Jr.
(74) *Attorney, Agent, or Firm* — Knobbe, Martens, Olson & Bear LLP

(57) ABSTRACT

Embodiments of a declustered, fault-tolerant array of storage devices for use with computer, networked, cloud-based, and other data storage applications are described. In some embodiments, the array generates a chunk group mapping with a high utilization of storage device space, provides evenly distributed hot spares, supports multiple erasure schemes including Reed-Solomon codes and Local Reconstruction Codes, and provides high storage device rebuild speed after storage device failure. Embodiments of methods of generating chunk group mappings are also disclosed. In some embodiments, chunk group mappings are determined based on the desired erasure scheme, the number of storage devices connected to the declustered, fault-tolerant array of storage devices, and a generated balanced incomplete block design or a generated partial balanced incomplete block design. Chunk group mappings are stored as a multi-level lookup table which includes at least a first erasure scheme pattern table and at least a second chunk group lookup table.

22 Claims, 7 Drawing Sheets

(51) Int. Cl.
*G06F 13/00* (2006.01)
*G06F 13/28* (2006.01)

(56) References Cited

U.S. PATENT DOCUMENTS

| | | | |
|---|---|---|---|
| 7,000,168 | B2 | 2/2006 | Kurtas et al. |
| 8,065,558 | B2 | 11/2011 | Zwisler et al. |
| 8,099,623 | B1 | 1/2012 | Li et al. |
| 8,639,969 | B2 | 1/2014 | Kawaguchi |
| 8,677,063 | B2 | 3/2014 | Becker-Szendy et al. |
| 9,189,335 | B2 | 11/2015 | Kawaguchi |
| 2007/0088990 | A1 | 4/2007 | Schmitz |
| 2009/0265510 | A1 | 10/2009 | Walther et al. |
| 2012/0030425 | A1 | 2/2012 | Becker-Szendy et al. |
| 2015/0121169 | A1* | 4/2015 | Iliadis ............... G06F 11/1076 714/766 |

OTHER PUBLICATIONS

Blaum, Mario et al. "An efficient scheme for tolerating double disk failures in RAID architectures" IEEE Trans on Computers, vol. 44, No. 2, pp. 192, Feb. 1995.
Dimakis, Alexandros G. et al. "A survey on network codes for distribution storage" IEEE, 2011.
U.S. Appl. No. 14/607,055, filed Jan. 27, 2015, Western Digital Technologies, Inc.
Declustered RAID, IBM Knowledge Center—(http://www.ibm.com/support/knowledgecenter/SSFKCN_4.1.0/com.ibm.cluster.gpfs.v4r1.gpfs200.doc/b11adv_introdeclustered.htm.
Elerath et al. "Enhanced reliability modeling of RAID storage systems" 37th Annual IEEE/IFIP International Conference on Dependable Systems and Networks, 2007.
Feresten, Paul. NetApp RAID-DP:Dual-parity RAID 6 Protection Without Compromise. White Paper, NetApp, Apr. 2010.
Ganger, Gregory R. et al. "Disk arrays, high-performance, high-reliability storage subsystems" IEEE Trans. Computer, 1994.
Haiman, Mark "Notes on reed-Solomon Codes" dated Feb. 2003—14 pages—, (https://math.berkeley.edu/~mhaiman/math55/reed-solomon.pdf).
Holland, Mark, et al. "Parity declustering for continuous operation in redundant disk arrays" Proceedings for the 5th Conference on Architectural Support for Programming Languages and Operating Systems, 1992.
HP Smart Storage for HP ProLiant Gen9 Servers. Technical White Paper. Sep. 2014.
"Huawei OceanStor Enterprise Unified Storage System Raid 2.0+ Technical White Paper" Huawei Techs. Co., Ltd., Jun. 4, 2014.
Huang, Cheng, "Erasure coding for storage application (Part II)", Microsoft Research, Tutorial at USENIX FAST, 2013.
IBM User's Guide ServeRAID Mega CLI. Second Edition, Aug. 2012.
Kaddeche et al. "Fault-tolerance in multi-disk multimedia servers" Advances in Computer and Information Sciences 1998.
Osuolale, Kazeem A, et al. "An Algorithm for constructing symmetric $((r+1)v, kr, K\lambda)$ BIBDs from affine resolvable $(v, b, r\ k, \lambda)$ BIBDs" 2014.
Ng et al. "Maintaining good performance in disk arrays during failure via uniform parity group distribution" IBM Research Division, 1992.
Thomasian, Alexander et al. "Hierarchical RAID: Design, performance, reliability, and recovery" J. Parallel Distrib. Comput., 2012, 1753-1769.
Thomasian, Alexander "Rebuild processing in RAID5 with emphasis on the supplementary parity augmentation method" ACM Computer Architecture, May 2012.
Shirriff, Kenneth W. "A logging file system for a high-performance RAID disk array" Ph.D. Thesis, Berkeley, 1995.

* cited by examiner

DECLUSTERED ARRAY OF STORAGE DEVICES WITH CHUNK GROUPS AND SUPPORT FOR MULTIPLE ERASURE SCHEMES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Technical Field

The present disclosure relates to storage systems, and more particularly, to declustered storage device arrays with chunk groups.

Description of the Related Art

Technological advances in hard disk drives, solid state drives, and other forms of storage devices have allowed for larger and larger storage capacities. However, the throughput of storage devices have not increased to the same extent as storage capacity increases. Thus, with larger and larger storage devices being employed in redundant storage arrays, more time is needed to repair any failed storage devices. For use cases that require redundant storage arrays to be in continuous operation or with minimal downtime, a long storage device rebuild or repair time is undesirable. As such, new methods of distributing data and parity among redundant arrays of storage devices are needed which facilitate increased storage device rebuild and repair speed.

DETAILED DESCRIPTION

Overview of RAID Systems

Figure 1:
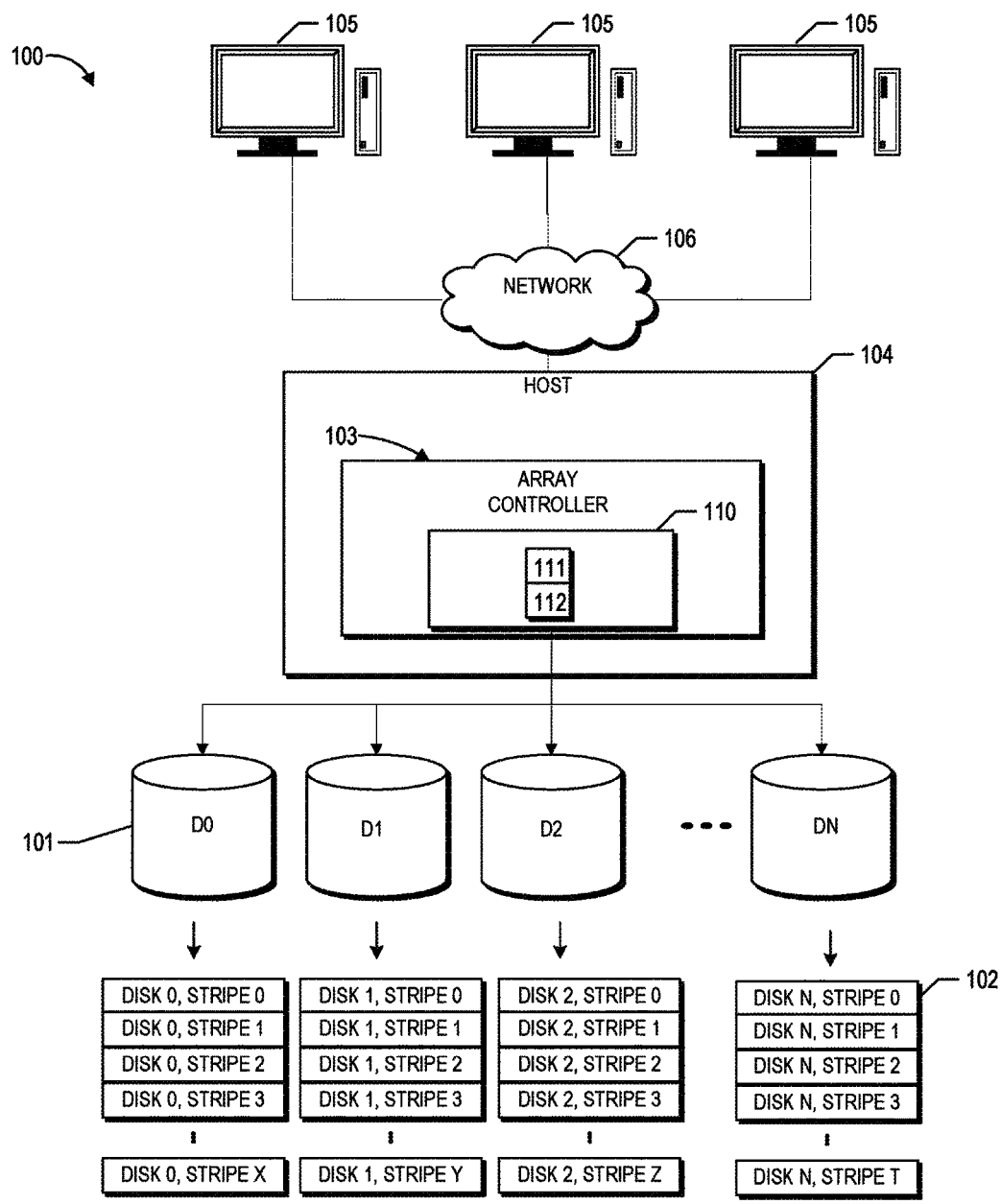
FIG. 1 is an illustration of a system in accordance with embodiments of this disclosure.

The term RAID (Redundant Array of Inexpensive (or Independent) Disks) covers a number of methods of storing computer data among multiple storage devices in a disk array. In addition to storing user data, RAID configurations generally also store redundancy information. Redundancy information enables the reconstruction of content on a failed disk, with or without taking the storage system offline. Redundancy information may be in the form of mirroring, which entails making an exact copy of the contents of another storage device. More sophisticated methods of storing redundancy information, generally referred to as erasure schemes or erasure codes, include storing parity information, which may be used with special algorithms to reconstruct user data on a failed storage device.

Within a storage device, such as a hard disk drive, solid state drive, or other type of computer storage medium, storage space is split into stripe units. A stripe unit can represent the minimum amount of contiguous data that can be allocated to one storage device before any data is allocated to any other disk. A data stripe unit, or simply a data unit, stores user data, while a parity stripe unit, or simply a parity unit, stores parity information that is calculated from user data. Within an array of storage devices using an erasure scheme, user data is distributed among chunk groups, which are a group of data units and associated parity units. When a user stores data on a storage device, the data is stored within data units and an array controller calculates parity, or redundancy, information based on the user data and stores it within the parity units. As is used herein, the terms "stripe unit" or "stripe" may be used when the distinction between data and parity is not pertinent to the discussion.

RAID 5 is one example of an erasure scheme which requires at least three storage devices and implements block-level striping with parity information distributed among the storage devices. In the event of a storage device failure, data is read from all storage devices to rebuild content on the failed storage device.

Reed-Solomon codes are a family of error correcting codes which add redundancy information to data so that data can be recovered in the event of a storage device failure or an error in transmission or retrieval. A particular Reed-Solomon code implementation may include 6 data units and 3 parity units per chunk group. These stripe units are distributed among at least 9 storage devices so that when one device fails, the 8 other storage devices are utilized to recover information lost on the failed disk. Examples of consumer devices that employ Reed-Solomon codes include CDs and DVDs. Certain RAID configurations also employ Reed-Solomon codes to add redundancy information.

Local Reconstruction Codes ("LRC") are another exemplary family of erasure schemes. In one implementation of a LRC may use 12 data units, 2 global parity units, and 2 local parity units which are used to reconstruct data in case of a storage device failure. Additional information regarding LRCs may be found in U.S. Patent Application No. 2014/0380125 to Calder et al.

Overview of Declustered RAID Systems

Parity declustering can refer to a parity-based redundancy scheme which provides better performance during online (continuous operation) failure recovery than commonly implemented RAID schemes, but without the large capacity overhead of mirroring.

A chunk group can refer to a collection of data and parity stripe units. Within a chunk group, user data is stored within the data stripe units while redundancy information is computed based on the data stripe units and stored in the parity stripe units. In a traditional RAID system, the number of stripe units per chunk group is equal to the total number of storage devices connected to the storage device array. A declustered redundant storage device array is one in which the number of storage devices connected to the storage device array is greater than the number of stripe units contained within a chunk group. In a declustered redundant storage device array, each chunk group contains stripe units from only a subset of the storage devices connected to the storage device array. Further, in each chunk group, each individual stripe unit is contained on distinct storage devices. In other words, if a particular embodiment uses an erasure scheme requiring 5 stripe units, then each chunk group will contain 5 stripe units, and each of those 5 stripe units will come from 5 separate storage devices. In general, compared to a traditional RAID, declustered storage device arrays can better take advantage of the parallelism provided by the declustered storage and produce higher overall system I/O throughput during recovery and/or a shorter recovery time.

A number of criteria exist for establishing good parity layout in a declustered parity array. For example, Mark Holland noted six such criteria, as briefly summarized below. Mark Holland & Garth A. Gibson, *Parity Declustering for Continuous Operation in Redundant Disk Arrays*, in Proceedings of the 5th Conference on Architectural Support for Programming Languages and Operating Systems (1992). The first four criteria deal with the relationships between stripe units and chunk group membership. The last two criteria are recommendations for the relationship between user data allocation and chunk group organization.

1) Single Failure Correcting.

No two stripe units in the same chunk group may reside on the same physical storage device. This criterion is basic to any redundancy organization that recovers the data of failed storage devices.

2) Distributed Reconstruction.

When any storage device fails, its user workload should be evenly distributed across all other storage devices in the array. When the failed storage device is replaced or repaired, the reconstruction workload should also be evenly distributed.

3) Distributed Parity.

Parity information should be evenly distributed across the array. Every data update causes a parity update, and so an uneven parity distribution would lead to imbalanced utilization (hot spots), since the disks with more parity would experience more load.

4) Efficient Mapping.

The functions mapping a file system's logical block address to physical disk addresses for the corresponding data stripe units and chunk groups and the appropriate inverse mappings must be efficiently implementable.

5) Large Write Optimization.

The allocation of contiguous user data to data stripe units should correspond to the allocation of data stripe units to chunk groups. This ensures that whenever a user performs a write that is the size of the data portion of a chunk group and starts on a chunk group boundary, it is possible to execute the write without pre-reading the prior contents of any disk data, since the new parity stripe unit depends only on the new data.

6) Maximal Parallelism.

A read of contiguous user data with size equal to a data stripe unit times the number of disks in the array should induce a single data stripe unit read on all disks in the array. This ensures maximum parallelism can be obtained.

In some cases, the distributed reconstruction criterion requires that the same number of units be read from each surviving disk during the reconstruction of a failed disk. This will be achieved if the number of times that a pair of disks contain stripe units from the same parity stripe is constant across all pairs of disks. One method of achieving these criteria is to provide a parity declustered layout based on a balanced incomplete block design.

Overview of Block Designs

Within combinatorial mathematics, a block design is a set and a family of subsets whose members are chosen to satisfy a set of chosen properties. A balanced incomplete block design is mathematically defined as follows. Given a finite set X with v elements and integers k, r, $\lambda \geq 1$, a balanced incomplete block design ("BIM") B is defined as a family of k-element subsets of X, called blocks, such that the number r of blocks containing x in X is not dependent on which x is chosen, and the number $\lambda$ of blocks containing given distinct elements x and y in X is also independent of the choices. Additionally, the parameters b and r are the number of blocks in B and the number of blocks containing a given element, respectively. This design B is called a (v, k, $\lambda$)-design or a (v, b, r, k, $\lambda$)-design.

The parameters of a (v, b, r, k, $\lambda$)-design are not independent of one another, as v, k, and $\lambda$ determine b and r. Additionally, not every arbitrary combination of integers v, k, and $\lambda$, are possible. Within the context of a parity declustered array of storage devices, X is the set of storage devices connected to an array controller, v is the number of storage devices, and k is the number of stripe units per chunk group as required by an erasure scheme.

Certain BIM solutions have been applied to particular erasure schemes. However, there is still a need for a generalized method of generating BIBDs that would be compatible with a wide variety of erasure schemes and storage device arrays. Additionally, there is still a need for generating parity declustered array layouts that approximate BIBD-based layouts when a BIM solution cannot be generated for particular combinations of erasure schemes and storage device arrays. In some embodiments, methods for generating balanced incomplete block designs compatible with a wide variety of erasure schemes and number of storage devices are provided. In various embodiments, methods for generating partial balanced incomplete block designs for when a balanced incomplete block design cannot be generated for a given erasure scheme and number of storage devices are provided.

Some disclosed embodiments also provide declustered arrays of storage devices and methods of storing data within declustered arrays of storage devices wherein chunk groups comprising stripe units from a plurality of storage devices are generated based on balanced incomplete block designs or partial balanced incomplete block designs, and wherein the declustered array of storage devices provide high utilization of storage device space, compatibility with multiple erasure schemes, evenly distributed hot spares, and high storage device rebuild speed.

Various embodiments of this disclosure provide a method of storing data and parity information in a declustered array of storage devices in accordance with BIBD. The method may include receiving an erasure scheme for distributing data and parity in the declustered array of storage devices, wherein each storage device is partitioned into a plurality of stripe units, and wherein in stripe unit is configured to store data, parity information, or is reserved for data recovery as a hot spare stripe unit; determining a balanced incomplete block design mapping that is compatible with the number of storage devices in the declustered array of storage devices and the received erasure scheme; grouping subsets of stripe units into a plurality of chunk groups based on the balanced incomplete block design mapping, wherein each chunk group comprises stripe units from different storage devices;

storing information representative of the erasure scheme and chunk groups within a multi-level table comprising at least a first-level erasure scheme pattern table, and at least a second-level chunk group lookup table; and storing data and parity information in at least a subset of the plurality of stripes in accordance with the multi-level table. The method may be performed under the control of at least one array controller coupled to the declustered array of storage devices. The balanced incomplete block design mapping may be determined by generating a first K-by-K matrix comprising entries that are a random permutation of integers 1 through N, wherein N is defined as the number of storage devices coupled to the declustered array of storage devices and K is defined as the number of data and parity stripe units associated with the received erasure scheme, and N is equal to K-squared; generating a second matrix that is a transpose of the first matrix; and generating K−1 additional square matrices, wherein each of the K−1 square matrices is formed by performing successive rotational operations on the first square matrix; and generating the balanced incomplete block design mapping by defining chunk groups based on each row of each square matrix generated.

The method may further include the recovery of data from a failed storage device by determining a set of chunk groups that includes one or more stripes located on the failed storage device; reading data and parity stored in other stripes associated with the set of chunk groups; reconstructing data and parity stored in the one or more stripes located on the failed storage device based on the erasure scheme; and storing the reconstructed data and parity in at least a subset of the plurality of hot spare stripes reserved for data recovery. The method may further include the recovery of data from a failed storage device by determining a set of chunk groups that includes one or more stripes located in the failed storage device; connecting a new storage device to the declustered array of storage devices, wherein the new storage device is partitioned into stripes of the same size as stripes in the other storage devices; reading data and parity from the other stripes associated with the set of chunk groups; reconstructing data and parity stored in the one or more stripes located on the failed storage device based on the erasure scheme; and storing the reconstructed data and parity in at least a subset of a plurality of stripes on the new storage device. The first-level erasure scheme pattern table of this method may comprise entries for select permutations of data and parity stripes according to the erasure scheme and the second-level chunk group lookup table may comprise entries defining chunk groups, wherein each chunk group comprises a plurality of data and parity stripes, wherein each stripe of each chunk group is located on a different storage device, and wherein the chunk group lookup table entries further identify an erasure scheme pattern defined in the first-level erasure scheme pattern table. The method may be compatible with existing RAID erasure codes, Reed-Solomon codes, and Local Reconstruction Codes.

In some embodiments, a method of storing data and parity information in a declustered array of storage devices in accordance with a partial balanced incomplete block design is provided. The method may include receiving an erasure scheme for distributing data and parity in the declustered array of storage devices, wherein each storage device is partitioned into a plurality of stripe units, and wherein in stripe unit is configured to store data, parity information, or is reserved for data recovery as a hot spare stripe unit; determining a partial balanced incomplete block design mapping that is compatible with the number of storage devices in the declustered array of storage devices and the received erasure scheme; grouping subsets of stripe units into a plurality of chunk groups based on the balanced incomplete block design mapping, wherein each chunk group comprises stripe units from different storage devices; storing information representative of the erasure scheme and chunk groups within a multi-level table comprising at least a first-level erasure scheme pattern table, and at least a second-level chunk group lookup table; and storing data and parity information in at least a subset of the plurality of stripes in accordance with the multi-level table. The method may be performed under the control of at least one array controller coupled to the declustered array of storage devices. The partial balanced incomplete block design mapping may be determined by first defining an integer D equal to the floor of N/K, where N and K are defined as above, except that N does not need to equal K-squared; initializing a chunk group list to hold chunk group mappings; and iteratively adding chunk group mappings to the chunk group list. The chunk group mappings are iteratively added by generating a 1 by N array consisting of a random permutation of the integers 1 through N; dividing the array into D subarrays of K elements each and discarding any remaining elements; appending the D subarrays to the chunk group list; checking a correlation attribute for each pair of storage devices in the chunk group list; and ending the iteratively adding if the correlation attribute is at least 1 for every pair of storage devices in the chunk group list. The iterative loop may also include the step of determining a utilization ratio of the storage devices on each iteration of adding chunk group mappings to the chunk group list, and ending the iterative loop if the utilization ratio is at least 90% and the correlation attribute for each pair of storage devices in the chunk group list is at least 1.

The method may further include the recovery of data from a failed storage device by determining a set of chunk groups that includes one or more stripes located on the failed storage device; reading data and parity stored in other stripes associated with the set of chunk groups; reconstructing data and parity stored in the one or more stripes located on the failed storage device based on the erasure scheme; and storing the reconstructed data and parity in at least a subset of the plurality of hot spare stripes reserved for data recovery. The method may further include the recovery of data from a failed storage device by determining a set of chunk groups that includes one or more stripes located in the failed storage device; connecting a new storage device to the declustered array of storage devices, wherein the new storage device is partitioned into stripes of the same size as stripes in the other storage devices; reading data and parity from the other stripes associated with the set of chunk groups; reconstructing data and parity stored in the one or more stripes located on the failed storage device based on the erasure scheme; and storing the reconstructed data and parity in at least a subset of a plurality of stripes on the new storage device. The first-level erasure scheme pattern table of this method may comprise entries for select permutations of data and parity stripes according to the erasure scheme and the second-level chunk group lookup table may comprise entries defining chunk groups, wherein each chunk group comprises a plurality of data and parity stripes, wherein each stripe of each chunk group is located on a different storage device, and wherein the chunk group lookup table entries further identify an erasure scheme pattern defined in the first-level erasure scheme pattern table.

The method may be compatible with existing RAID erasure codes, Reed-Solomon codes, and Local Reconstruction Codes.

In various embodiments, a declustered, fault-tolerant array of storage devices is provided. The declustered, fault-tolerant array of storage devices may comprise a plurality of storage devices, wherein each storage device is partitioned into a plurality of stripe units, each stripe unit capable of storing data, parity information, or is reserved for data recovery as a hot spare stripe unit; at least one array controller coupled to the plurality of storage devices, wherein the at least one array controller is configured to store data and parity in the plurality of stripes according to a multi-level mapping table, wherein the multi-level mapping table comprises at least a first-level erasure scheme table comprising entries for select permutations of data and parity stripes according to an erasure scheme, and at least a second-level chunk group lookup table comprising entries defining chunk groups, each chunk group comprising a plurality of data and parity stripes, wherein each stripe of each chunk group is located on a different storage device, and wherein the chunk group lookup table entries further identify an erasure scheme pattern defined in the erasure scheme pattern table. The declustered, fault-tolerant array of storage devices may be configured such that the at least one array controller is configured to generate, and optionally store, the multi-level mapping table, and the generation may be based on either a balanced incomplete block design or a partial balanced incomplete block design. In some cases, the mapping table may be generated by a processor in a device external to the array controller. The declustered, fault-tolerant array of storage devices may also be compatible with existing RAID erasure codes, Reed-Solomon codes, and Local Reconstruction Codes.

Declustered RAID System

FIG. 1 illustrates a system in accordance with embodiments of this disclosure. A plurality of client machines 105 are connected through a network 106, which may be the internet, a local network, or other network known in the art, to a host machine 104. The host machine may comprise a CPU, RAM, and at least one array controller 103. The array controller 103 stores a multi-level mapping table 110. The first level of the mapping table 111 comprises an erasure scheme list. The second level of the mapping table 112 comprises a chunk group look up table. The host machine 104 and the array controller 103 are coupled to a plurality of storage devices 101 (labeled as D0 through DN), which may comprise hard disk drives, solid state drives, and other types of computer data storage devices known in the art. Each storage device 101 further comprises a plurality of stripe units 102. Each stripe unit 102 is the same size as other stripe units. Within this specification, a particular stripe unit will be designated with the storage device it is contained in (Disk #) and its stripe index (Stripe $). For example, the fourth stripe on the fifth disk in an array will be written as <5,4>, following the format of <disk,stripe>. As used herein "disk" is a general term used to describe a storage device which may include devices that do not employ a physical rotating magnetic disk for storage (e.g., solid state drive).

A plurality of storage devices 101, labeled D0 through DN, are connected to an array controller 103 housed within a host machine 104. Each storage device 101 is divided into a plurality of stripe units 102. Each stripe unit 102 is the same size as other stripe units on other storage devices. Within this specification, a stripe unit "b" located on a disk "a" will be denoted as <a,b>. The plurality of storage devices, or a subset of the plurality of storage devices 101, may be connected to more than one array controller 103. In one embodiment, the array controller 103 contains a two-level mapping table 110, stored in a computer readable format. The first level of the mapping table is an erasure scheme lookup table 111. The second level of the mapping table is a chunk group lookup table 112. The array controller 103 arranges data and parity information on the plurality of storage devices based on the two-level mapping table 110. In other embodiments, a different number of levels may be in the table structure (e.g., 1, 3 or more).

The host machine 104 may be connected to a network 106, which may be the internet, a local network, or any other network capable of connecting other devices to the host machine 104. A plurality of client machines 105 are connected via the network 106 to the host machine 104. The client machines 105 are able to send requests through the network 106 to the host machine 104 to read or write data to the plurality of storage devices 101.

The actual capacity of each storage device 101 is not pertinent to embodiments of this disclosure, however, they typically may range from gigabytes to terabytes. Embodiments of this disclosure are not dependent on the storage capacity of each storage device 101 and thus should not be limited only to storage devices with current storage capacity levels. The storage devices 101 do not need to be of the same storage capacity (e.g., a 1 terabyte (TB) storage device could work with a 1.5 TB storage device within the same storage device array). Within this specification, examples of stripe units 102 may be on the order of bytes, kilobytes, or megabytes. However, it is to be understood that embodiments of this disclosure are not dependent on the size of each stripe unit 102 and thus should not be limited by typical stripe unit sizes.

Some embodiments of this disclosure may support a number of physical storage devices 101 of at least 3 per organization. An organization is one redundant storage device array connected to at least one array controller in a host machine. An organization is defined as the collection of storage devices coupled to at least one array controller wherein each storage device within the organization is correlated with other storage devices within the same organization. Two storage devices are "correlated" when at least one stripe unit from each storage device are contained in the same chunk group. Depending on the use scenario, a host machine 104 may comprise multiple organizations of storage devices connected to multiple array controllers.

Chunk Groups

Figure 2A:
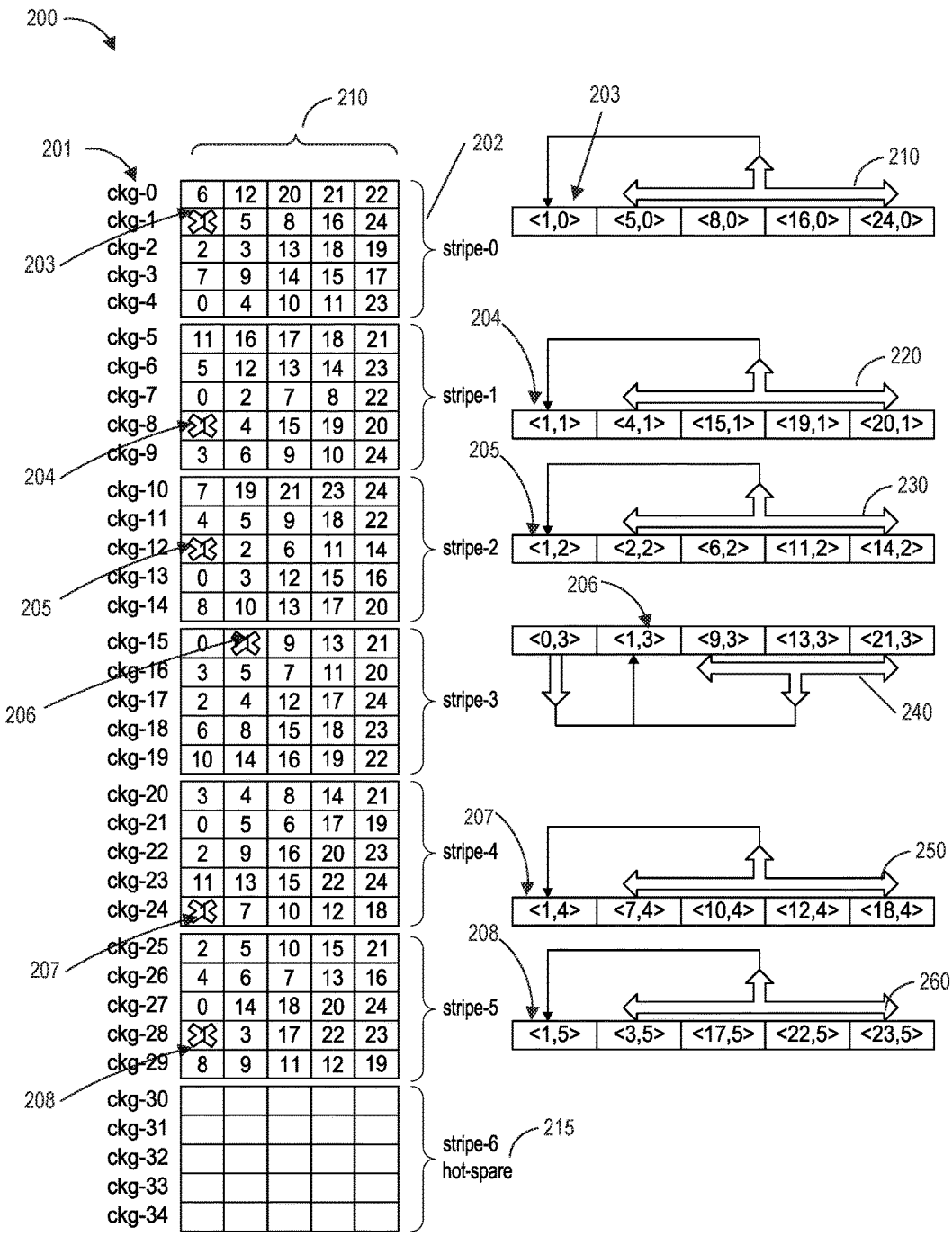
FIG. 2A is a conceptual diagram of a chunk group mapping and system recovery in accordance with some embodiments of this disclosure.

FIG. 2A illustrates an example of a chunk group mapping in accordance with some embodiments of this disclosure. In certain embodiments, the illustrated chunk group mapping is managed by the array controller 103. The chunk group mapping in FIG. 2A uses 25 storage devices, labeled 0 through 24, in one organization. A zone is one set of chunk group mappings, including stripes that are reserved for system repair, also called hot spares. For example, the mapping in FIG. 2A utilizes stripe units 0 through 6 on storage devices 0 through 24. However, more than 7 stripe units exist on each storage device. Thus, the mapping that utilizes stripe units 0 through 6 on storage devices 0 through 24 is considered one "zone." Hot spare stripes are not accessible by the user during normal operation and their function will be explained in greater detail further within this disclosure. Each chunk group 201 consists of 5 stripe units 203. The left most column in FIG. 2A lists chunk group indices 201 which indicate a particular chunk group. Each chunk group 201 consists of the stripe units on the row 210 immediately adjacent to the chunk group index 201. For example, chunk group ckg-0 consists of the stripe units <6,0>, <12,0>, <20,0>, <21,0>, <22,0>.

Chunk groups ckg-0 through ckg-4 form one block 202. Within block 202, each storage device is mapped to a chunk group once. Furthermore, block 202 only contains stripe units with index 0. The next block of chunk groups ckg-5 through ckg-9 only contain stripe units with index 1. For example, ckg-5 as shown in FIG. 2A consists of the stripe units <11,1>, <16,1>, <17,1>, <18,1>, <21,1>.

Chunk groups ckg-30 through ckg-34 are reserved as hot spare stripes 215. In other words, stripe 6 on all each storage device is reserved for system repair as "hot spare" stripes. Hot spare stripes allow the repair of a failed storage device by distributively storing the reconstructed information from the failed storage device on the other storage devices within the array. Hot spare stripes are distributed evenly throughout the declustered array of storage devices, for example by reserving stripes at the end of each zone as hot spare stripes. A new storage device does not need to be inserted into the array when hot spare stripes are used to repair a failed storage device.

FIG. 2A further illustrates a process 200 for repairing a failed disk according to some embodiments. This process can be performed by the array controller 103 in various embodiments. In FIG. 2A, elements 203 through 208 point to failed stripe units. The process involves first determining which storage device has failed. In this example, disk 1 has failed. The process then involves determining which chunk groups are affected by the storage device failure, by determining each chunk group that contains a stripe unit physically located on the failed disk. The array controller may compare a storage device ID for the failed storage device against a chunk group lookup table, or search within the chunk group lookup table for each instance of the storage device ID, in order to determine which chunk groups are affected by the storage device failure. In this example, searching within the chunk group lookup table reveals that chunk groups ckg-1, ckg-8, ckg-12, ckg-15, ckg-24, and ckg-28 all contain at least one stripe unit from failed disk 1. Therefore, chunk groups ckg-1, ckg-8, ckg-12, ckg-15, ckg-24, and ckg-28 are all affected by the disk 1 failure. Next, as shown in operation 220, data and/or parity information is read from the other stripe units in each affected chunk group in order to reconstruct the data or parity information stored on the failed stripe unit. For example, to reconstruct the information stored on <1,0> in chunk group ckg-1, stripe units <5,0>, <8,0>, <16,0>, and <24,0> are read by the array controller. The information stored on <1,0> is then reconstructed by performing calculations in accordance with the erasure scheme chosen for the parity declustered array. The reconstructed data is then stored in hot spare stripes or in a newly inserted disk to replace the failed disk. If the chunk group mapping, described by the chunk group lookup table, is based on a BIBD, then the reconstruction workload may be evenly distributed among all of the other storage devices in the storage device array. If the chunk group mapping is based on a partial balanced incomplete block design ("PBIBD"), then the reconstruction workload may be approximately evenly distributed among all of the other storage devices in the storage device array. Either method, utilizing a BIBD or a PBIBD chunk group mapping, may provide efficient reconstruction of a failed storage device by reading data and/or parity information from every, or nearly every, storage device while also reducing the amount of data and/or parity that needs to be read from each individual storage device.

Figure 2B:
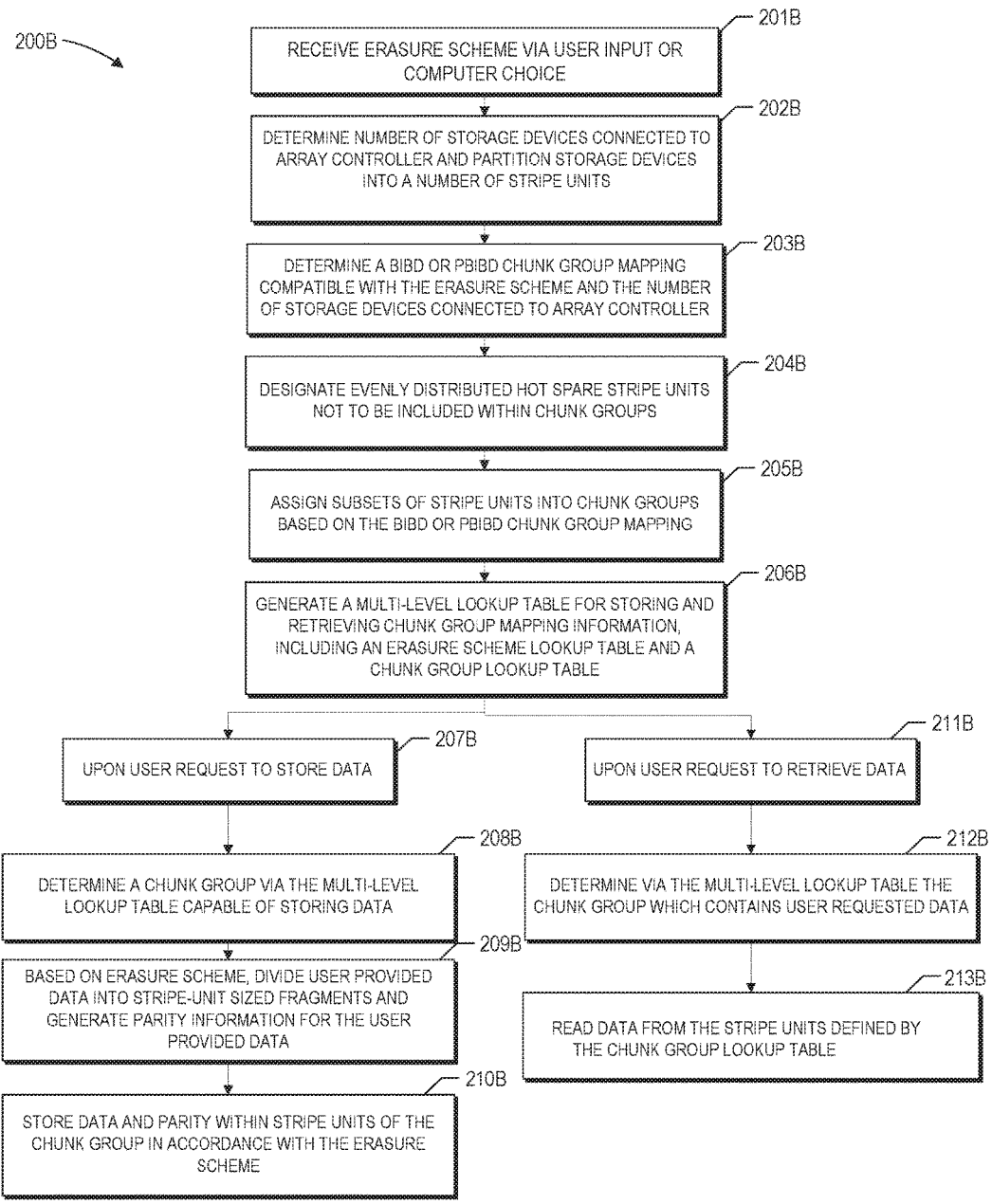
FIG. 2B illustrates a process for storing and/or retrieving data utilizing chunk group mappings.

FIG. 2B illustrates a process 200B for storing and/or retrieving data utilizing chunk group mappings. The process 200B may be performed by an array controller, or it may be performed by a separate processor within the host machine, or it may be performed by an array controller under directions from a separate processor within the host machine or a client machine. It is to be understood that for purposes of describing this illustration, a step performed by an array controller may also be performed by or directed by a separate processor within the host machine or client machine. At step 201B, an array controller receives an erasure scheme via a user input. In some embodiments, the erasure scheme may be designated by the host computer as a default erasure scheme, or as a computer-determined choice. At step 202B, the array controller determines the number of storage devices connected to the array controller and partitions the storage devices into a plurality of stripe units within each storage device. The number of stripe units per storage device does not need to be the same between separate storage devices. At step 203B, the array controller determines a BIBD or PBIBD chunk group mapping that is compatible with both the number of storage devices and the received erasure scheme. The process of determining a BIM or PBIBD chunk group mapping is described in more detail in reference to FIGS. 3, 4, and 5, herein. At step 204B, the array controller designates stripe units that are reserved as hot spare stripe units. In some embodiments, the hot spare stripe units will be designated such that they are evenly distributed among all the stripe units within each storage device. These hot spare stripes will not be included in chunk groups meant for storing user data and parity information, unless a repair operation is requested. In step 205B, subsets of stripe units are grouped, or assigned, into chunk groups based on the BIBD or PBIBD chunk group mapping determined in step 203B. In step 206B, the array controller generates a multi-level lookup table that represents the chunk group mappings. The multi-level lookup table includes an erasure scheme lookup table and a chunk group lookup table. The multi-level lookup table is described in greater detail in reference to FIG. 6 herein.

If a user requests to store data within the declustered storage device array, the array controller will receive a request to store data in step 207B. In step 208B, the array controller determines a chunk group via the multi-level lookup table that has available space to store more data. If the user wishes to overwrite data already stored in a chunk group, then the array controller will determine which chunk group contains the data to be overwritten. In step 209B, the array controller divides the user data into stripe-unit sized fragments based on the requirements of the erasure scheme. The array controller also generates parity information, calculated from the data stripe units, based on the erasure scheme. In step 210B, the array controller stores the user data and generated parity information within the stripe units of the chunk group in accordance with the erasure scheme.

If a user requests to retrieve data, the array controller will receive a request to retrieve data in step 211B. In step 212B, the array controller determines, via the multi-level lookup table, which stripe units in which chunk group contains the requested data. In step 213B, the array controller reads data from the stripe units defined by the chunk group lookup table. The array controller may then present the data to the user or to a separate processor or RAM in the host machine or to a processor or RAM in a client machine.

Generating Block Designs

Figure 3:
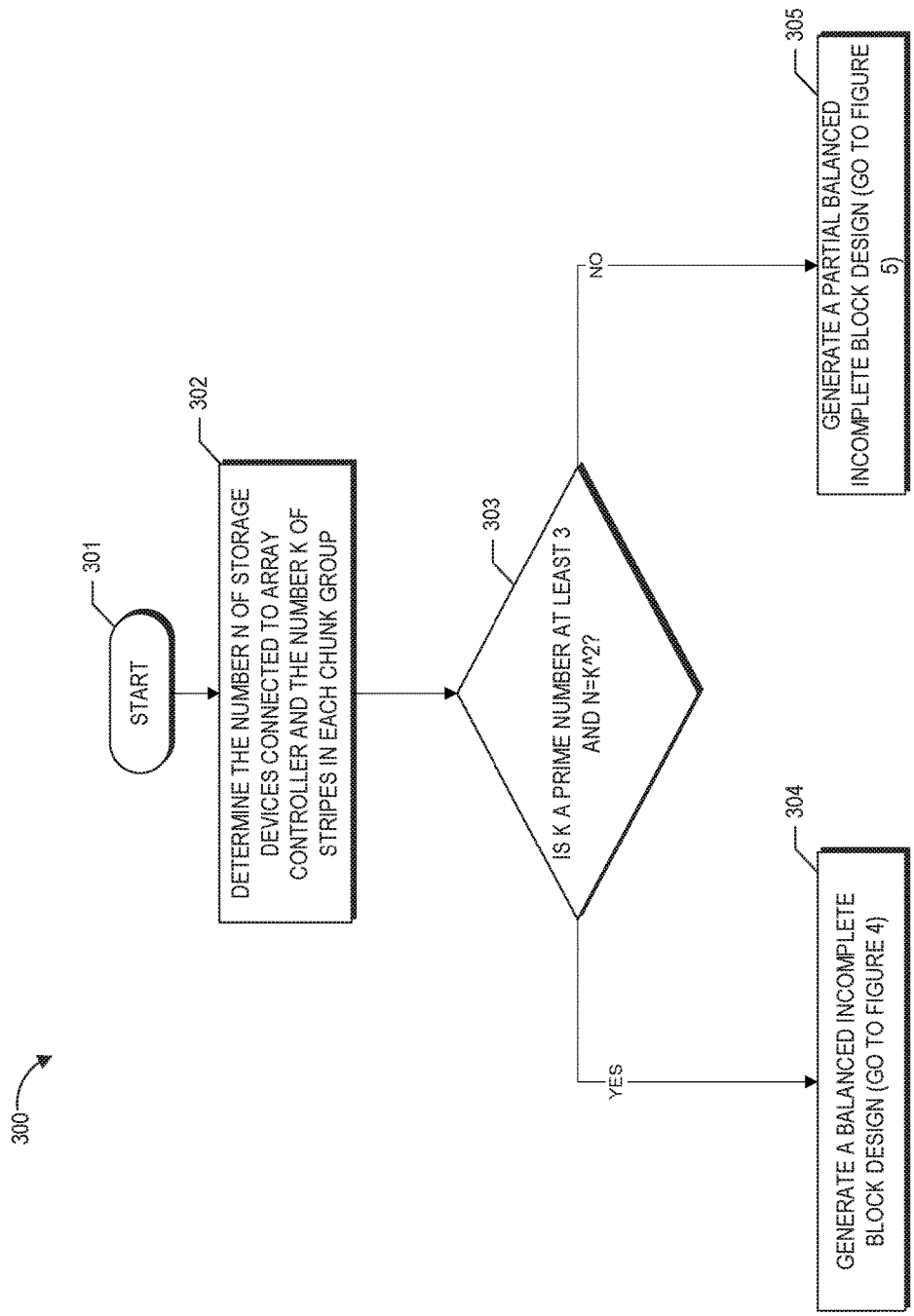
FIG. 3 is a flow chart illustrating the generation of a balanced incomplete block design or a partial balanced incomplete block design in accordance with some embodiments of this disclosure.

FIG. 3 is a flow chart illustrating the generation of a balanced incomplete block design or a partial balanced incomplete block design in accordance with some embodiments of this disclosure. In certain embodiments, the illustrated process is implemented by the array controller 103. The process may also be performed by a processor that is separate from the array controller (e.g., one that is within the host machine, or some other device), or it may be performed by the array controller under directions from a separate processor within the host machine or a client machine. Depending on the number of storage devices that are coupled to the at least one array controller, a BIM mapping may not be possible. If a BIBD mapping is not possible, then a PBIBD mapping is generated to approximate a BIBD mapping. The process starts at step 301. Next, in step 302, the number N of storage devices connected to the at least one array controller is determined, along with the number K of stripe units per chunk group. The number K is the total number of data and parity stripe units needed per chunk group, based on the chosen erasure scheme. In step 303, the array controller checks whether K is a prime number at least 3. Additionally, the array controller checks whether N is equal to K squared. In some embodiments, a method of generating BIM mappings when N is equal to K squared is provided. If N is equal to K squared, then the array controller continues to generate a balanced incomplete block design, described in greater detail in FIG. 4. If N is not equal to K squared, then the array controller continues to generate a partial balanced incomplete block design, described in greater detail in FIG. 5.

Figure 4:
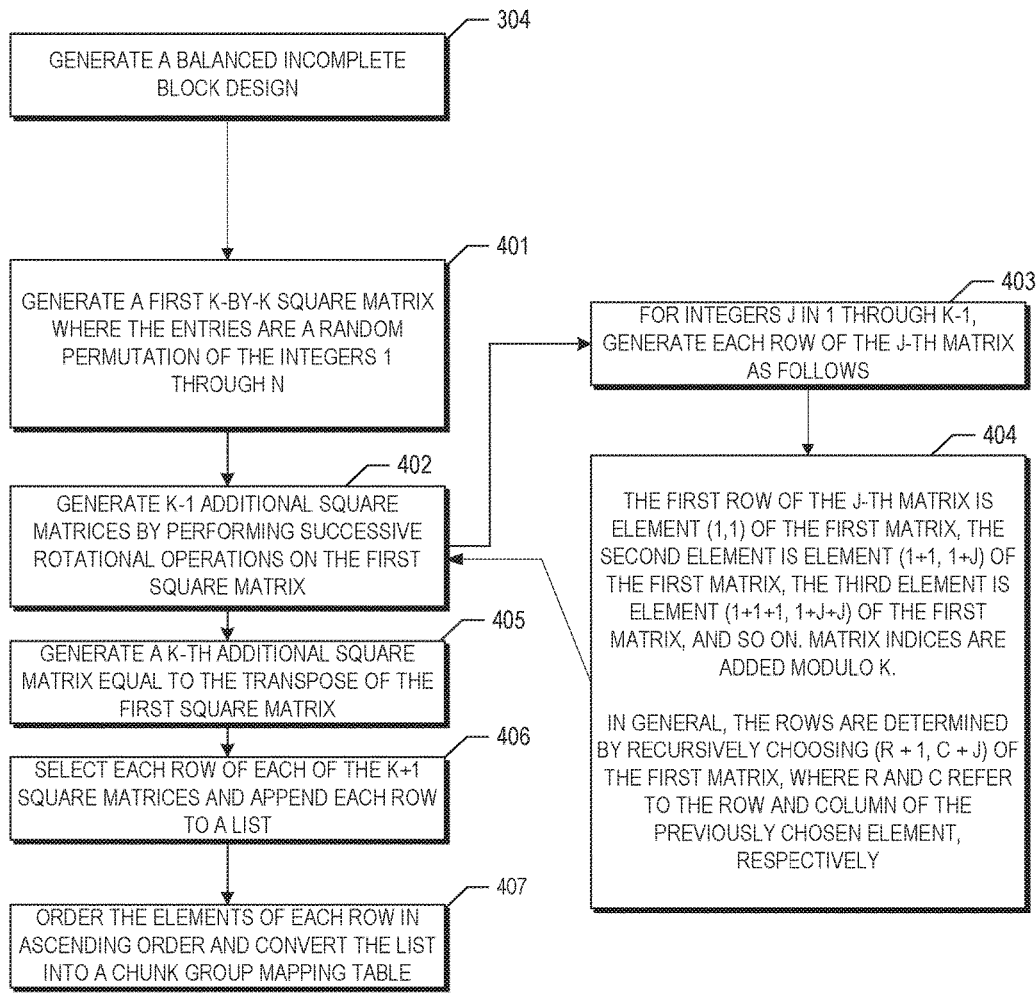
FIG. 4 is a flow chart following from FIG. 3 illustrating the generation of a balanced incomplete block design in accordance with some embodiments of this disclosure.

FIG. 4 is a flow chart following from FIG. 3 illustrating the generation of a BIBD according to some embodiments. In certain embodiments, the illustrated process is implemented by the array controller 103. The process may also be performed by a processor that is separate from the array controller (e.g., one that is within the host machine, or some other device), or it may be performed by the array controller under directions from a separate processor within the host machine or a client machine. The process starts at step 304, which is a continuation from step 304 in FIG. 3. Next, in step 401, the array controller generates a K by K square matrix wherein the entries are a random permutation of the integers 1 through N.

$$M_O = randperm(N) = \begin{bmatrix} 22 & 7 & 21 & 23 & 13 \\ 6 & 17 & 25 & 2 & 9 \\ 3 & 14 & 19 & 4 & 20 \\ 16 & 8 & 15 & 18 & 10 \\ 11 & 5 & 1 & 24 & 12 \end{bmatrix} \quad (Eq. 1)$$

Eq. (1) illustrates an example outcome of step 401 where K is 5 and N is 25. The matrix $M_O$ is generated using a random permutation function randperm(N), which places the integers 1 through 25 in a random permutation within the matrix.

Next, in step 402, K−1 additional square matrices are formed by performing successive rotational operations on the first square matrix. Step 402 comprises steps 403 and 404. Step 403 provides that for integers J in 1 through K−1, each row of the J-th matrix is formed according to step 404. Step 403 may be implemented as computer instructions to initialize a loop. The generation of each row of the J-th matrix starts with element (1,1) of matrix $M_O$. The second element is then the element (1+1,1+J) of the first matrix. The third element is then element (1+1+1,1+J+J) of the first matrix, and so on. Modular arithmetic is used when adding matrix indices. Written more compactly, this procedure can be described as picking elements from $M_O$ according to the rule (row+1, col+J).

For example, when J=1, the matrix $M_1$ is generated as follows:

Row 1 of $M_1$:

(1,1)→(2,2)→(3,3)→(4,4)→(5,5)=[22 17 19 18 12]    (Eq. 2)

Row 2 of $M_1$:

(2,1)→(3,2)→(4,3)→(5,4)→(1,5)=[6 14 15 24 13]    (Eq. 3)

Repeating the process until Row 5:

(5,1)→(1,2)→(2,3)→(4,5)=[11 7 25 4 10]    (Eq. 4)

The fully formed $M_1$ matrix is then:

$$M_1 = \begin{bmatrix} 22 & 17 & 19 & 18 & 12 \\ 6 & 14 & 15 & 24 & 13 \\ 3 & 8 & 1 & 23 & 9 \\ 16 & 5 & 21 & 2 & 20 \\ 11 & 7 & 25 & 4 & 10 \end{bmatrix} \quad (Eq. 5)$$

As an additional example, when J=2, the rows of matrix $M_2$ are formed as follows:

(1,1)→(2,3)→(3,5)→(4,2)→(5,4)=[22 25 20 8 24]

(2,1)→(3,3)→(4,5)→(5,2)→(1,4)=[6 19 10 5 23]

(3,1)→(4,3)→(5,5)→(1,2)→(2,4)=[3 5 12 7 2]

(4,1)→(5,3)→(1,5)→(2,2)→(3,4)=[16 1 13 17 4]

(5,1)→(1,3)→(3,5)→(4,2)→(5,4)=[11 21 9 14 9 18]    (Eq. 6)

$$M_2 = \begin{bmatrix} 22 & 25 & 20 & 8 & 24 \\ 6 & 19 & 10 & 5 & 23 \\ 3 & 15 & 12 & 7 & 2 \\ 16 & 1 & 13 & 17 & 4 \\ 11 & 21 & 9 & 14 & 18 \end{bmatrix} \quad (Eq. 7)$$

Following this procedure, matrices $M_3$ and $M_4$ are also generated. In step 405, an additional K-th square matrix is also formed, equal to the transpose of the first matrix $M_O$.

$$M_3 = \begin{bmatrix} 22 & 2 & 14 & 10 & 1 \\ 6 & 4 & 8 & 12 & 21 \\ 3 & 18 & 5 & 13 & 25 \\ 16 & 24 & 7 & 9 & 19 \\ 11 & 23 & 17 & 20 & 15 \end{bmatrix} \quad (Eq. 8)$$

$$M_4 = \begin{bmatrix} 22 & 9 & 4 & 15 & 5 \\ 6 & 20 & 18 & 1 & 7 \\ 3 & 10 & 24 & 21 & 17 \\ 16 & 12 & 23 & 25 & 14 \\ 11 & 13 & 2 & 19 & 8 \end{bmatrix} \quad (Eq. 9)$$

$$M_5 = M_0^T = \begin{bmatrix} 22 & 6 & 3 & 16 & 11 \\ 7 & 17 & 14 & 8 & 5 \\ 21 & 25 & 19 & 15 & 1 \\ 23 & 2 & 4 & 18 & 24 \\ 13 & 9 & 20 & 10 & 12 \end{bmatrix}$$ (Eq. 10)

Because each matrix $M_1$ through $M_K$ are formed by successively picking elements from $M_O$ according to a rule in step 404, the procedure may be called successive rotations. Alternatively, a closed form matrix multiplication formula may also be used to generate the above matrices.

Next, in step 406, each row of the K+1 matrices are appended to a list. In step 407, the elements of each row in the list may be ordered in ascending order before the list is converted to a chunk group mapping table. The conversion of the list into a chunk group mapping table may include mapping the elements of the list to storage device IDs. For example, the chunk groups in FIG. 2 correspond to the list created via the process in FIG. 4, however, the storage device IDs range from 0 to 24, whereas the list elements range from 1 to 25. Thus, the list elements may be mapped to the actual storage device IDs. Stripe unit information and erasure scheme information may also be added to each element of the list, as will be shown in greater detail in FIG. 6 in order to convert the list to a chunk group mapping table.

It can be verified from the generated matrices that the list, and the converted chunk group mapping table, satisfies the requirements for a BIBD. For example, single failure correcting may require that no two stripe units within a chunk group can be located on the same physical storage device. Each chunk group, represented by each row of matrices $M_O$ through $M_K$, does not contain the same storage device ID more than once.

Figure 5:
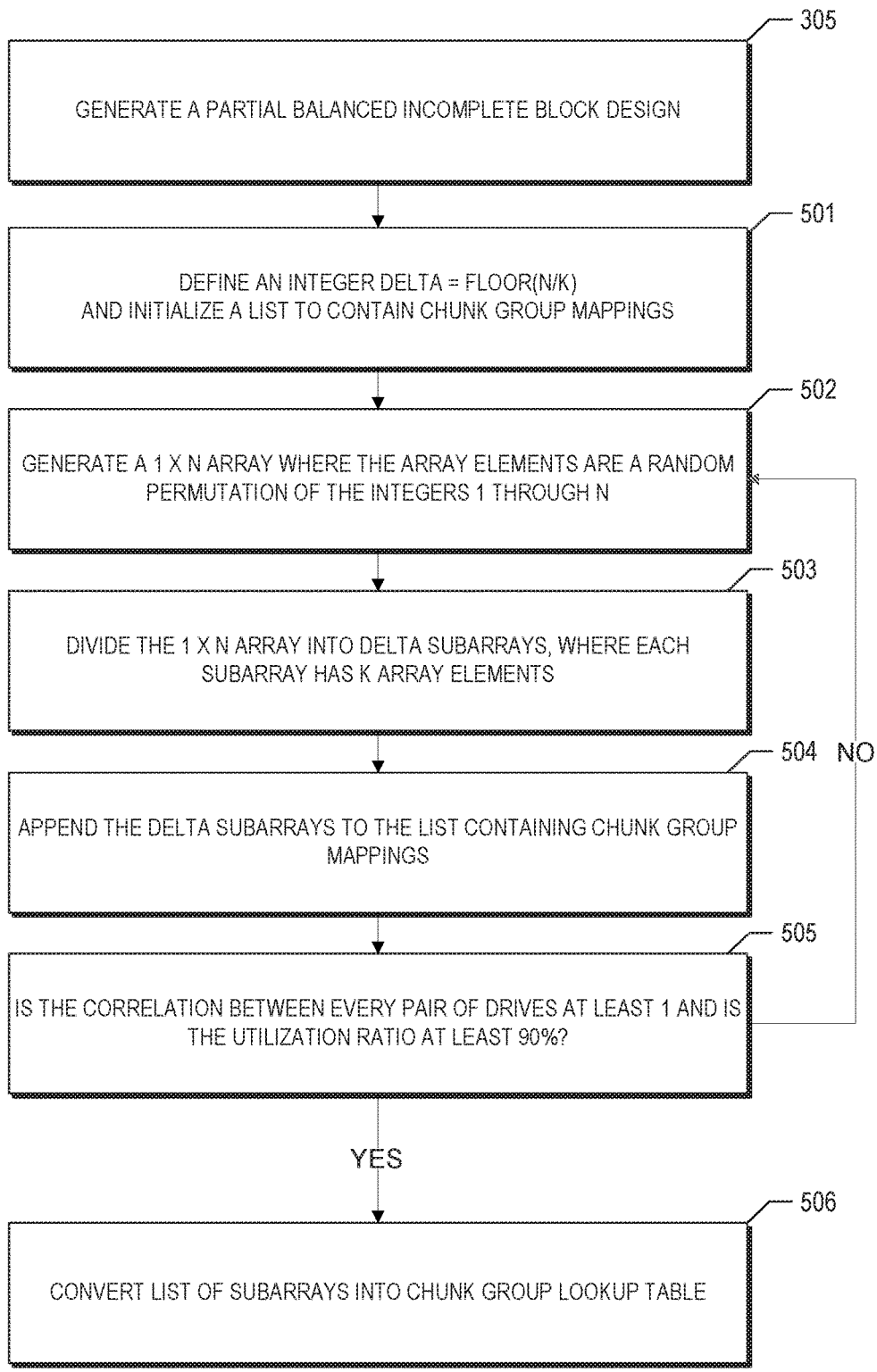
FIG. 5 is a flow chart following from FIG. 3 illustrating the generation of a partial balanced incomplete block design in accordance with some embodiments of this disclosure.

FIG. 5 is a flow chart illustrating the generation of a PBIBD according to some embodiments. In certain embodiments, the illustrated process is implemented by the array controller 103. The process may also be performed by a processor that is separate from the array controller (e.g., one that is within the host machine, or some other device), or it may be performed by the array controller under directions from a separate processor within the host machine or a client machine. As explained herein, when a BIBD solution does not exist for the particular combination of N and K, a PBIBD solution is generated to produce chunk group mappings that approximate the results of a BIBD solution. The process starts at step 305 which is a continuation from FIG. 3. In step 501, an integer Delta is defined to be the floor of N divided by K. The floor function takes the integer part of a number without rounding. For example:

$$\text{floor}\left(\frac{12}{5}\right) = 2$$ (Eq. 11)

A list is also initialized that will later be populated with chunk group mappings.

Next, in step 502, a 1 by N array is generated where the array elements are a random permutation of the integers 1 through N. Equation 12, below, illustrates an example outcome of step 502 if N is 12 and K is 5.

[4 7 2 9 12 11 15 3 6 8 10] (Eq. 12)

In step 503, the generated array is divided into Delta subarrays, where each array has K elements. Because N is not necessarily a multiple of K, leftover elements are permitted and will be discarded. Equation 13 illustrates an outcome of step 503 based on the array in Equation 12.

[4 7 2 9 12]
[11 1 5 3 6] (Eq. 13)

As shown in Equation 13, the elements 8 and 10 were leftover and discarded. In step 504, the Delta subarrays are then appended to the list initialized in step 501. Each subarray in the list defines a chunk group mapping.

In step 505, a check is performed that will determine whether the process will loop back to step 502. The check may include calculating the correlation between every pair of storage devices to determine if the correlation is at least 1. The correlation between a pair of storage devices is the number of times that both storage devices are mapped to the same chunk group. When the correlation is at least 1 for every pair of storage devices, then the distributed reconstruction criteria is met—meaning when a storage device fails, its user workload is distributed across all other storage devices in the array, or when the failed storage device is replaced or repaired, the reconstruction workload is distributed across all other storage devices in the array. In a BIBD based mapping, the correlation between every pair of storage devices is exactly 1, which allows workload to be distributed evenly among all other storage devices in the array. In a PBIBD based mapping, the correlation between a pair of storage devices may be greater than 1, so some workload distribution may not be perfectly even. It is also contemplated that alternative correlation checks may be used—for example, the correlation check may be satisfied if a certain percentage of all pairs of storage devices has a correlation of at least 1.

Step 505 may further include a utilization ratio check. The utilization ratio may be defined according to Equation 14.

$$U \equiv \frac{K \cdot B}{S \cdot N}$$ (Eq. 14)

Where U is the utilization ratio, K is the number of data and parity stripe units per chunk group, B is the number of chunk groups, S is the maximum number of stripe units per storage device within the array of storage devices, and N is the number of storage devices in the array. The utilization ratio is an overall measurement of whether the stripe units within each storage device are being used in the declustered array. The utilization ratio check may determine whether the utilization ratio meets a certain threshold. For example, in one embodiment, the utilization ratio check would be satisfied if the utilization ratio were 0.90 (90%) or above. Other threshold values besides 0.90 may be used. If the correlation check and utilization ratio checks are not passed, then the process may loop back to step 502.

If the checks in step 505 are passed, then in step 506, the list of subarrays is converted into a chunk group lookup table. The subarray elements may be mapped to actual storage device IDs. Stripe unit information and erasure scheme information may also be added to each chunk group.

Multi-Level Lookup Tables

Figure 6:
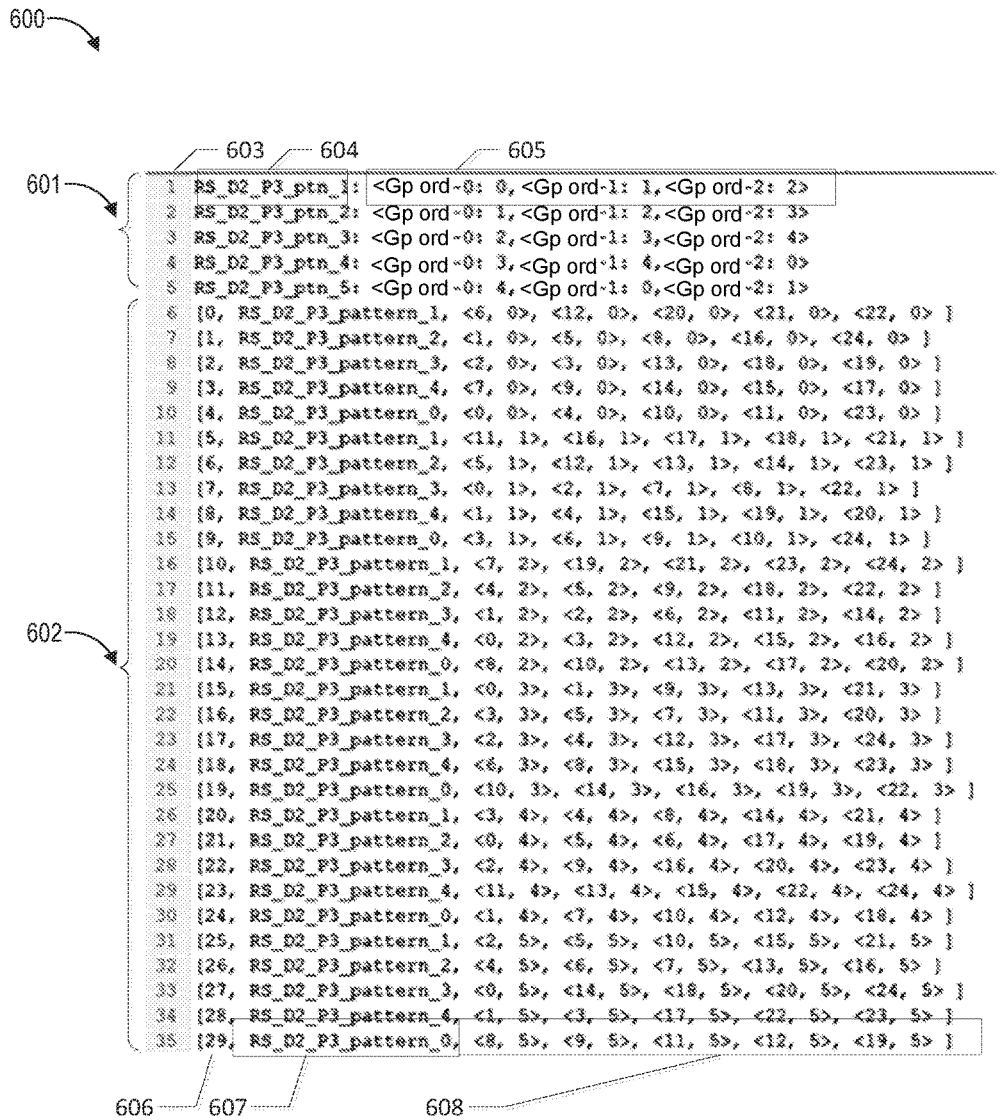
FIG. 6 is an illustration showing an example of a two-level mapping table in accordance with some embodiments of this disclosure.

FIG. 6 is an illustration of a portion of a multi-level lookup table 600 with a first level erasure scheme lookup table 601 and a second level chunk group lookup table 602 according to some embodiments. In certain embodiments, the table 600 is managed by the array controller 103. Line numbers 603 precede each entry in the multi-level lookup table. In this example, entries on lines 1 through 5 form the erasure scheme lookup table 601. An erasure scheme lookup table entry comprises an erasure scheme pattern identifier 604 and an erasure scheme pattern 605. Within the example illustrated in FIG. 6, the erasure scheme pattern identifier 604 on line 1 reads "RS_D2_P3_ptn_1," which indicates that a Reed Solomon code is used with two data stripe units and three parity stripe units. The erasure scheme pattern 605 on line 1 reads "<Gp ord-0: 0, Gp ord-1: 1, Gp ord-2:2>," which indicates that, consistent with the Reed Solomon code, the global parity order-0 stripe unit is the 0-th stripe unit identified in a chunk group, the global parity order-1 stripe unit is the 1st stripe unit identified in a chunk group, and the global parity order-2 stripe unit is the 2nd stripe unit identified in a chunk group. The two data stripe units are then the remaining 3rd and 4th stripe units identified in a chunk group. A select number of erasure scheme patterns are listed which distribute parity stripes evenly among the storage devices. For example, the five erasure scheme patterns on lines 1 through 5 may be generated by starting with a first pattern on line 1, and performing a left-symmetric one-round rotation.

Chunk group lookup table 602 comprises entries that further comprise a chunk group identifier (or ID) 606, an erasure scheme reference 607, and a chunk group mapping 608. The chunk group ID 606 may be a numeric ID which identifies each unique chunk group. The erasure scheme reference 607 refers back to the erasure scheme pattern identifier 604 in the erasure scheme lookup table 601. The chunk group mapping 608 comprises a list of stripe units which are identified as <storage device ID, stripe unit ID>.

For illustration purposes, FIG. 6 shows the same chunk group mappings as in FIG. 2 and FIG. 4. As explained herein with respect to step 407 in FIG. 4, list elements may be mapped to storage device IDs, reordered in ascending order, stripe unit information may be added, and erasure scheme information may be added to convert the list of numbers to a chunk group mapping table. Comparing the first row of matrix $M_O$ with chunk group 0 (line 6 in FIG. 6), illustrates this conversion.

The first row [22 7 21 23 13] is reordered as [7 13 21 22 23]. Then the list elements are mapped to storage device IDs. In this case, the storage device IDs range from 0 to 24 while the list elements range from 1 to 25. Thus [7 13 21 22 23] becomes [6 12 20 21 22]. Stripe unit information is also added. In this case, the chunk group uses the 0th stripe unit from each storage device. Thus, [6 12 20 21 22] becomes <6,0>, <12,0>, <20,0>, <21,0>, <22,0>. The added erasure scheme pattern identifier 607 on line 6 indicates that "pattern 1" applies to this particular chunk group. An array controller interprets this identifier by looking up the corresponding erasure scheme pattern identifier 604 and erasure scheme pattern 605. According to the erasure scheme pattern 605, the global parity order-0 stripe unit is <6,0>, the global parity order-1 stripe unit is <12,0>, and the global parity order-2 stripe unit is <20,0>.

While FIG. 6 illustrates the multi-level lookup table that corresponds to the BIBD example discussed in FIG. 4, a similar multi-level lookup table may be generated for chunk group mappings based on a PBIBD. Included in the Appendix are two additional examples of multi-level tables with an erasure scheme lookup table and chunk group lookup table, similar to the one shown in FIG. 6.

CONCLUSION

Those of skill in the art will appreciate the benefits of embodiments of the present disclosure. Improvements in erasure schemes or erasure coding have led to improved storage space efficiency with high levels of data protection. However, as erasure schemes become more complex, the time and resources required to rebuild or repair a failed storage device increases. Declustered storage device arrays take advantage of parallelism by reducing the number of input/output operations per second (IOPS) required per storage device, which also reduces the overall response time of the declustered storage device array, reduces storage device rebuilt time, and also improves the mean time to data loss (MTTDL). Additionally, the use of evenly distributed hot spare storage further reduces the TOPS per storage device when rebuilding or repairing failed storage devices. Presently, systems do not exist that combine the advantages of complex erasure schemes with the advantages of declustered storage device arrays and evenly distributed hot spare storage. One skilled in the art would appreciate that the present disclosure provides embodiments of systems and methods of integrating general erasure schemes, including Local Reconstruction Codes and Reed-Solomon codes, within declustered storage device arrays while implementing hot spare storage. Some embodiments utilize a novel multi-level table, incorporating an erasure scheme lookup table and chunk group lookup table, to provide efficient implementation by an array controller. Some implementations may also scale read/write speed and repair or rebuild speed with the number of storage devices in the array. For example, certain implementations in accordance with the present disclosure have been able to achieve single-drive failure rebuild speeds of approximately 1 GB/s using twenty-five 10 k RPM hard disk drives and 1.4 GB/s using forty-nine 10 k RPM hard disk drives.

Other Variations

Those skilled in the art will appreciate that in some embodiments additional system components can be utilized, and disclosed system components can be combined or omitted. The actual steps taken in the disclosed processes, such as the processes illustrated in FIGS. 2-5, may differ from those shown in the figures. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to hard disk drives, hybrid hard drives, and the like. In addition, other forms of storage (e.g., DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, references to "a method" or "an embodiment" throughout are not intended to mean the same method or same embodiment, unless the context clearly indicates otherwise.

The corresponding structures, materials, acts, and equivalents of all means or step plus function elements in the claims below are intended to include any structure, material, or act for performing the function in combination with other claimed elements as specifically claimed. The description of the various embodiments of the present invention has been presented for purposes of illustration and description, but is not intended to be exhaustive or limited to the embodiments disclosed. Many modifications and variations will be apparent to those of ordinary skill in the art without departing from the scope and spirit of this disclosure. The example embodiments were chosen and described in order to best explain the principles of this disclosure and the practical application, and to enable others of ordinary skill in the art to understand this disclosure for various embodiments with various modifications as are suited to the particular use contemplated.

Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The attached Appendix describes various example embodiments and features related to methods of storing data and parity information in a declustered array of storage devices, and declustered, fault-tolerant array of storage devices. The Appendix is expressly bodily incorporated in its entirety and is part of this disclosure. The embodiments described above are compatible with and incorporate or be a part of the embodiments described in the Appendix, and some or all of the features described above can be used or otherwise combined with any of the features described in the Appendix.

APPENDIX

The following is a first example of a multi-level lookup table in accordance with the present disclosure with an erasure scheme lookup table and chunk group lookup table compatible with 255 storage devices and a Reed-Solomon erasure code using 10 data stripes and 4 parity stripes per chunk group. Due to length, portions of the multi-level lookup table are omitted.

RS_D10_P4_ptn_1: <Gp ord-0: 0, Gp ord-1: 1, Gp ord-2: 2, Gp ord-3: 3>
RS_D10_P4_pt_2: <Gp ord-0: 1, Gp ord-1: 2, Gp ord-2: 3, Gp ord-3: 4>
RS_D10_P4_ptn_3: <Gp ord-0: 2, Gp ord-1: 3, Gp ord-2: 4, Gp ord-3: 5>
RS_D10_P4_ptn_4: <Gp ord-0: 3, Gp ord-1: 4, Gp ord-2: 5, Gp ord-3: 6>
RS_D10_P_pt_5: <Gp ord-0: 4, Gp ord-1: 5, Gp ord-2: 6, Gp ord-3: 7>
RS_D10_P4_ptn_6: <Gp ord-0: 5, Gp ord-1: 6, Gp ord-2: 7, Gp ord-3: 8>
RS_D10_P4_ptn_7: <Gp ord-0: 6, Gp ord-1: 7, Gp ord-2: 8, Gp ord-3: 9>
RS_D10_P4_ptn_8: <Gp ord-0: 7, Gp ord-1: 8, Gp ord-2: 9, Gp ord-3: 10>
RS_D10_P4_9: <Gp ord-0: 8, Gp ord-1: 9, Gp ord-2: 10, Gp ord-3: 11>
RS_D10_P4_10: <Gp ord-0: 9, Gp ord-1: 10, Gp ord-2: 11, Gp ord-3: 12>
RS_D10_P4_ptn_11: <Gp ord-0: 10, Gp ord-1: 11, Gp ord-2: 12, Gp ord-3: 13>
RS_D10_P4_ptn_12: <Gp ord-0: 11, Gp ord-1: 12, Gp ord-2: 13, Gp ord-3: 0>
RS_D10_P4_ptn_13: <Gp ord-0: 12, Gp ord-1: 13, Gp ord-2: 0, Gp ord-3: 1>
RS_D10_P4_ptn_14: <Gp ord-0: 13, Gp ord-1: 0, Gp ord-2: 1, Gp ord-3: 2>
[0, RS_D10_P4_ptn_1, <21, 0>, <31, 0>, <33, 0>, <39, 0>, <90, 0>, <91, 0>, <98, 0>, <122, 0>, <145, 0>, <151, 0>, <169, 0>, <173, 0>, <174, 0>, <243, 0>]
[1, RS_D10_P4_ptn_2, <5, 0>, <34, 0>, <54, 0>, <111, 0>, <118, 0>, <120, 0>, <126, 0>, <147, 0>, <159, 0>, <164, 0>, <189, 0>, <227, 0>, <235, 0>, <240, 0>]
[2, RS_D10_P4_ptn_3, <2, 0>, <10, 0>, <15, 0>, <53, 0>, <67, 0>, <68, 0>, <95, 0>, <100, 0>, <104, 0>, <114, 0>, <134, 0>, <135, 0>, <139, 0>, <165, 0>]
[3, RS_D10_P4_ptn_4, <29, 0>, <44, 0>, <59, 0>, <76, 0>, <132, 0>, <148, 0>, <175, 0>, <183, 0>, <185, 0>, <210, 0>, <215, 0>, <217, 0>, <223, 0>, <234, 0>]
[4, RS_D10_P4_ptn_5, <61, 0>, <71, 0>, <73, 0>, <77, 0>, <112, 0>, <146, 0>, <149, 0>, <162, 0>, <170, 0>, <213, 0>, <216, 0>, <218, 0>, <248, 0>, <253, 0>]
[5, RS_D10_P4_ptn_6, <6, 0>, <32, 0>, <50, 0>, <69, 0>, <85, 0>, <106, 0>, <128, 0>, <133, 0>, <181, 0>, <211, 0>, <228, 0>, <231, 0>, <236, 0>, <241, 0>]
[6, RS_D10_P4_ptn_7, <37, 0>, <57, 0>, <75, 0>, <80, 0>, <99, 0>, <102, 0>, <142, 0>, <156, 0>, <171, 0>, <186, 0>, <195, 0>, <204, 0>, <220, 0>, <237, 0>]
[7, RS_D10_P4_ptn_8, <16, 0>, <27, 0>, <41, 0>, <88, 0>, <127, 0>, <144, 0>, <150, 0>, <158, 0>, <161, 0>, <163, 0>, <201, 0>, <222, 0>, <229, 0>, <238, 0>]
[8, RS_D10_P4_ptn_9, <40, 0>, <46, 0>, <79, 0>, <97, 0>, <110, 0>, <119, 0>, <130, 0>, <179, 0>, <193, 0>, <194, 0>, <212, 0>, <219, 0>, <226, 0>, <249, 0>]
[9, RS_D10_P4_ptn_10, <13, 0>, <45, 0>, <55, 0>, <62, 0>, <143, 0>, <154, 0>, <155, 0>, <192, 0>, <196, 0>, <197, 0>, <239, 0>, <246, 0>, <252, 0>, <254, 0>]
[10, RS_D10_P4_ptn_11, <7, 0>, <66, 0>, <83, 0>, <89, 0>, <92, 0>, <96, 0>, <103, 0>, <116, 0>, <138, 0>, <168, 0>, <180, 0>, <203, 0>, <207, 0>, <251, 0>]
[11, RS_D10_P4_ptn_12, <4, 0>, <58, 0>, <78, 0>, <82, 0>, <105, 0>, <137, 0>, <141, 0>, <187, 0>, <200, 0>, <208, 0>, <209, 0>, <230, 0>, <232, 0>, <247, 0>]
[12, RS_D10_P4_ptn_13, <20, 0>, <24, 0>, <28, 0>, <30, 0>, <36, 0>, <47, 0>, <51, 0>, <52, 0>, <63, 0>, <107, 0>, <108, 0>, <176, 0>, <178, 0>, <184, 0>]
[13, RS_D10_P4_ptn_14, <25, 0>, <26, 0>, <42, 0>, <48, 0>, <49, 0>, <60, 0>, <86, 0>, <87, 0>, <109, 0>, <123, 0>, <177, 0>, <182, 0>, <233, 0>, <245, 0>]

[14, RS_D10_P4_ptn_1, <0, 0>, <14, 0>, <18, 0>, <43, 0>, <72, 0>, <93, 0>, <101, 0>, <129, 0>, <160, 0>, <188, 0>, <191, 0>, <199, 0>, <202, 0>, <242, 0>]
[15, RS_D10_P4_ptn_2, <22, 0>, <35, 0>, <64, 0>, <70, 0>, <81, 0>, <115, 0>, <124, 0>, <125, 0>, <136, 0>, <140, 0>, <172, 0>, <198, 0>, <206, 0>, <214, 0>]
[16, RS_D10_P4_ptn_3, <1, 0>, <3, 0>, <17, 0>, <23, 0>, <74, 0>, <84, 0>, <113, 0>, <131, 0>, <152, 0>, <157, 0>, <190, 0>, <221, 0>, <224, 0>, <244, 0>]
[17, RS_D10_P4_ptn_4, <8, 0>, <9, 0>, <12, 0>, <19, 0>, <38, 0>, <56, 0>, <65, 0>, <94, 0>, <121, 0>, <153, 0>, <166, 0>, <167, 0>, <205, 0>, <250, 0>]
[18, RS_D10_P4_ptn_5, <5, 1>, <25, 1>, <38, 1>, <45, 1>, <47, 1>, <69, 1>, <77, 1>, <87, 1>, <105, 1>, <140, 1>, <152, 1>, <192, 1>, <196, 1>, <204, 1>]
[19, RS_D10_P4_ptn_6, <9, 1>, <15, 1>, <48, 1>, <50, 1>, <63, 1>, <80, 1>, <134, 1>, <146, 1>, <153, 1>, <163, 1>, <167, 1>, <184, 1>, <219, 1>, <250, 1>]
[20, RS_D10_P4_ptn_7, <13, 1>, <40, 1>, <54, 1>, <64, 1>, <65, 1>, <79, 1>, <102, 1>, <104, 1>, <113, 1>, <120, 1>, <143, 1>, <169, 1>, <208, 1>, <232, 1>]
[21, RS_D10_P4_ptn_8, <24, 1>, <35, 1>, <82, 1>, <101, 1>, <109, 1>, <117, 0>, <122, 1>, <144, 1>, <186, 1>, <205, 1>, <211, 1>, <217, 1>, <229, 1>, <231, 1>]
[22, RS_D10_P4_ptn_9, <10, 1>, <36, 1>, <89, 1>, <125, 1>, <128, 1>, <138, 1>, <168, 1>, <170, 1>, <179, 1>, <185, 1>, <213, 1>, <215, 1>, <243, 1>, <248, 1>]
[23, RS_D10_P4_ptn_10, <11, 0>, <22, 1>, <75, 1>, <84, 1>, <95, 1>, <126, 1>, <142, 1>, <154, 1>, <162, 1>, <181, 1>, <201, 1>, <209, 1>, <218, 1>, <249, 1>]
[24, RS_D10_P4_ptn_11, <2, 1>, <3, 1>, <66, 1>, <70, 1>, <81, 1>, <110, 1>, <116, 1>, <123, 1>, <132, 1>, <157, 1>, <189, 1>, <194, 1>, <238, 1>, <240, 1>]
[25, RS_D10_P4_ptn_12, <60, 1>, <61, 1>, <72, 1>, <76, 1>, <90, 1>, <93, 1>, <118, 1>, <141, 1>, <145, 1>, <166, 1>, <171, 1>, <198, 1>, <223, 1>, <234, 1>]
[26, RS_D10_P4_ptn_13, <28, 1>, <39, 1>, <44, 1>, <83, 1>, <111, 1>, <119, 1>, <148, 1>, <173, 1>, <197, 1>, <199, 1>, <203, 1>, <207, 1>, <235, 1>, <253, 1>]
[27, RS_D10_P4_ptn_14, <17, 1>, <27, 1>, <43, 1>, <49, 1>, <56, 1>, <71, 1>, <91, 1>, <98, 1>, <155, 1>, <161, 1>, <172, 1>, <175, 1>, <222, 1>, <246, 1>]
. . .

The following is a second example of a multi-level lookup table in accordance with the present disclosure with an erasure scheme lookup table and a chunk group lookup table compatible with 120 storage devices and a Local Reconstruction Code using 12 data stripes, 2 global parity stripes, and 2 local parity stripes per chunk group. Due to length, portions of the multi-level lookup table are omitted.

LRC_D12_GP2_LP2_ptn_1: <Gp ord-1: 0, Gp ord-2: 1, Lp-group_1, P#2, D<3, 4, 5, 6, 7, 8>, Lp-group_2, P#9, D<10, 11, 12, 13, 14, 15>
LRC_D12_GP2_LP2_ptn_2: <Gp ord-1: 1, Gp ord-2: 2, Lp-group_1, P#3, D<4, 5, 6, 7, 8, 9>, Lp-group_2, P#10, D<11, 12, 13, 14, 15, 0>
LRC_D12_GP2_LP2_ptn_3: <Gp ord-1: 2, Gp ord-2: 3, Lp-group_1, P#4, D<5, 6, 7, 8, 9, 10>, Lp-group_2, P#11, D<12, 13, 14, 15, 0, 1>
LRC_D12_GP2_LP2_ptn_4: <Gp ord-1: 3, Gp ord-2: 4, Lp-group_1, P#5, D<6, 7, 8, 9, 10, 11>, Lp-group_2, P#12, D<13, 14, 15, 0, 1, 2>
LRC_D12_GP2_LP2_ptn_5: <Gp ord-1: 4, Gp ord-2: 5, Lp-group_1, P#6, D<7, 8, 9, 10, 11, 12>, Lp-group_2, P#13, D<14, 15, 0, 1, 2, 3>
LRC_D12_GP2_LP2_ptn_6: <Gp ord-1: 5, Gp ord-2: 6, Lp-group_1, P#7, D<8, 9, 10, 11, 12, 13>, Lp-group_2, P#14, D<15, 0, 1, 2, 3, 4>
LRC_D12_GP2_LP2_ptn_7: <Gp ord-1: 6, Gp ord-2: 7, Lp-group_1, P#8, D<9, 10, 11, 12, 13, 14>, Lp-group_2, P#15, D<0, 1, 2, 3, 4, 5>
LRC_D12_GP2_LP2_ptn_8: <Gp ord-1: 7, Gp ord-2: 8, Lp-group_1, P#9, D<10, 11, 12, 13, 14, 15>, Lp-group_2, P#0, D<1, 2, 3, 4, 5, 6>
LRC_D12_GP2_LP2_ptn_9: <Gp ord-1: 8, Gp ord-2: 9, Lp-group_1, P#10, D<11, 12, 13, 14, 15, 0>, Lp-group_2, P#1, D<2, 3, 4, 5, 6, 7>
LRC_D12_GP2_LP2_ptn_10: <Gp ord-1: 9, Gp ord-2: 10, Lp-group_1, P#11, D<12, 13, 14, 15, 0, 1>, Lp-group_2, P#2, D<3, 4, 5, 6, 7, 8>
LRC_D12_GP2_LP2_ptn_11: <Gp ord-1: 10, Gp ord-2: 11, Lp-group_1, P#12, D<13, 14, 15, 0, 1, 2>, Lp-group_2, P#3, D<4, 5, 6, 7, 8, 9>
LRC_D12_GP2_LP2_ptn_12: <Gp ord-1: 11, Gp ord-2: 12, Lp-group_1, P#13, D<14, 15, 0, 1, 2, 3>, Lp-group_2, P#4, D<5, 6, 7, 8, 9, 10>
LRC_D12_GP2_LP2_ptn_13: <Gp ord-1: 12, Gp ord-2: 13, Lp-group_1, P#14, D<15, 0, 1, 2, 3, 4>, Lp-group_2, P#5, D<6, 7, 8, 9, 10, 11>
LRC_D12_GP2_LP2_ptn_14: <Gp ord-1: 13, Gp ord-2: 14, Lp-group_1, P#15, D<0, 1, 2, 3, 4, 5>, Lp-group_2, P#6, D<7, 8, 9, 10, 11, 12>
LRC_D12_GP2_LP2_ptn_15: <Gp ord-1: 14, Gp ord-2: 15, Lp-group_1, P#0, D<1, 2, 3, 4, 5, 6>, Lp-group_2, P#7, D<8, 9, 10, 11, 12, 13>
LRC_D12_GP2_LP2_ptn_16: <Gp ord-1: 15, Gp ord-2: 0, Lp-group_1, P#1, D<2, 3, 4, 5, 6, 7>, Lp-group_2, P#8, D<9, 10, 11, 12, 13, 14>
[0, LRC_D12_GP2_LP2_ptn_1, <2, 0>, <5, 0>, <15, 0>, <21, 0>, <31, 0>, <33, 0>, <34, 0>, <39, 0>, <54, 0>, <67, 0>, <90, 0>, <91, 0>, <95, 0>, <98, 0>, <111, 0>, <118, 0>]
[1, LRC_D12_GP2_LP2_ptn_2, <10, 0>, <29, 0>, <44, 0>, <53, 0>, <59, 0>, <61, 0>, <68, 0>, <69, 0>, <71, 0>, <73, 0>, <76, 0>, <77, 0>, <100, 0>, <104, 0>, <112, 0>, <114, 0>]
[2, LRC_D12_GP2_LP2_ptn_3, <6, 0>, <16, 0>, <27, 0>, <32, 0>, <37, 0>, <40, 0>, <41, 0>, <50, 0>, <57, 0>, <75, 0>, <80, 0>, <85, 0>, <88, 0>, <99, 0>, <102, 0>, <106, 0>]
[3, LRC_D12_GP2_LP2_ptn_4, <7, 0>, <13, 0>, <45, 0>, <46, 0>, <55, 0>, <62, 0>, <66, 0>, <79, 0>, <83, 0>, <89, 0>, <92, 0>, <97, 0>, <103, 0>, <110, 0>, <116, 0>, <119, 0>]
[4, LRC_D12_GP2_LP2_ptn_5, <4, 0>, <20, 0>, <24, 0>, <28, 0>, <36, 0>, <47, 0>, <51, 0>, <52, 0>, <58, 0>, <63, 0>, <78, 0>, <82, 0>, <96, 0>, <105, 0>, <107, 0>, <108, 0>]
[5, LRC_D12_GP2_LP2_ptn_6, <14, 0>, <18, 0>, <25, 0>, <26, 0>, <30, 0>, <42, 0>, <43, 0>, <48, 0>, <49, 0>, <60, 0>, <72, 0>, <86, 0>, <87, 0>, <93, 0>, <101, 0>, <109, 0>]
[6, LRC_D12_GP2_LP2_ptn_7, <0, 0>, <1, 0>, <3, 0>, <17, 0>, <22, 0>, <23, 0>, <35, 0>, <38, 0>, <64, 0>, <70, 0>, <74, 0>, <81, 0>, <84, 0>, <94, 0>, <113, 0>, <115, 0>]
[7, LRC_D12_GP2_LP2_ptn_8, <0, 1>, <2, 1>, <6, 1>, <15, 1>, <25, 1>, <27, 1>, <31, 1>, <39, 1>, <44, 1>, <45, 1>, <49, 1>, <53, 1>, <54, 1>, <69, 1>, <107, 1>, <115, 1>]
[8, LRC_D12_GP2_LP2_ptn_9, <12, 0>, <14, 1>, <19, 0>, <28, 1>, <50, 1>, <55, 1>, <63, 1>, <65, 0>, <90, 1>, <93, 1>, <95, 1>, <96, 1>, <97, 1>, <98, 1>, <103, 1>, <114, 1>]
[9, LRC_D12_GP2_LP2_ptn_10, <8, 0>, <13, 1>, <22, 1>, <26, 1>, <29, 1>, <36, 1>, <42, 1>, <61, 1>, <75, 1>, <84, 1>, <91, 1>, <100, 1>, <108, 1>, <111, 1>, <116, 1>, <117, 0>]

[10, LRC_D12_GP2_LP2_ptn_11, <7, 1>, <10, 1>, <24, 1>, <30, 1>, <38, 1>, <41, 1>, <43, 1>, <51, 1>, <66, 1>, <73, 1>, <81, 1>, <99, 1>, <102, 1>, <106, 1>, <109, 1>, <118, 1>]
[11, LRC_D12_GP2_LP2_ptn_12, <17, 1>, <18, 1>, <23, 1>, <34, 1>, <35, 1>, <48, 1>, <59, 1>, <60, 1>, <72, 1>, <74, 1>, <76, 1>, <77, 1>, <83, 1>, <87, 1>, <92, 1>, <119, 1>]
[12, LRC_D12_GP2_LP2_ptn_13, <3, 1>, <21, 1>, <56, 0>, <57, 1>, <58, 1>, <62, 1>, <64, 1>, <67, 1>, <68, 1>, <71, 1>, <80, 1>, <88, 1>, <89, 1>, <110, 1>, <112, 1>, <113, 1>]
[13, LRC_D12_GP2_LP2_ptn_14, <4, 1>, <5, 1>, <9, 0>, <11, 0>, <16, 1>, <20, 1>, <32, 1>, <37, 1>, <40, 1>, <52, 1>, <78, 1>, <79, 1>, <82, 1>, <86, 1>, <94, 1>, <104, 1>]
[14, LRC_D12_GP2_LP2_ptn_15, <0, 2>, <3, 2>, <20, 2>, <24, 2>, <30, 2>, <40, 2>, <53, 2>, <60, 2>, <62, 2>, <63, 2>, <65, 1>, <78, 2>, <84, 2>, <92, 2>, <95, 2>, <102, 2>]
[15, LRC_D12_GP2_LP2_ptn_16, <8, 1>, <13, 2>, <25, 2>, <28, 2>, <39, 2>, <50, 2>, <51, 2>, <55, 2>, <69, 2>, <79, 2>, <80, 2>, <94, 2>, <97, 2>, <116, 2>, <117, 1>, <119, 2>]
[16, LRC_D12_GP2_LP2_ptn_1, <1, 1>, <17, 2>, <18, 2>, <26, 2>, <37, 2>, <81, 2>, <85, 1>, <87, 2>, <90, 2>, <91, 2>, <96, 2>, <99, 2>, <104, 2>, <105, 1>, <108, 2>, <110, 2>]
[17, LRC_D12_GP2_LP2_ptn_2, <6, 2>, <9, 1>, <12, 1>, <14, 2>, <32, 2>, <42, 2>, <43, 2>, <54, 2>, <58, 2>, <59, 2>, <64, 2>, <71, 2>, <75, 2>, <76, 2>, <86, 2>, <98, 2>]
[18, LRC_D12_GP2_LP2_ptn_3, <7, 2>, <11, 1>, <15, 2>, <16, 2>, <31, 2>, <45, 2>, <46, 1>, <49, 2>, <70, 1>, <73, 2>, <88, 2>, <89, 2>, <106, 2>, <112, 2>, <113, 2>, <115, 2>]
[19, LRC_D12_GP2_LP2_ptn_4, <2, 2>, <5, 2>, <23, 2>, <27, 2>, <29, 2>, <33, 1>, <34, 2>, <38, 2>, <41, 2>, <57, 2>, <61, 2>, <68, 2>, <74, 2>, <103, 2>, <111, 2>, <114, 2>]
[20, LRC_D12_GP2_LP2_ptn_5, <4, 2>, <21, 2>, <22, 2>, <35, 2>, <36, 2>, <44, 2>, <47, 1>, <48, 2>, <52, 2>, <66, 2>, <67, 2>, <77, 2>, <82, 2>, <83, 2>, <101, 1>, <107, 2>]
[21, LRC_D12_GP2_LP2_ptn_6, <0, 3>, <15, 3>, <29, 3>, <35, 3>, <41, 3>, <47, 2>, <48, 3>, <58, 3>, <62, 3>, <64, 3>, <79, 3>, <87, 3>, <91, 3>, <99, 3>, <103, 3>, <114, 3>]
[22, LRC_D12_GP2_LP2_ptn_7, <4, 3>, <8, 2>, <12, 2>, <17, 3>, <20, 3>, <23, 3>, <33, 2>, <38, 3>, <39, 3>, <74, 3>, <80, 3>, <81, 3>, <100, 2>, <106, 3>, <108, 3>, <112, 3>]
[23, LRC_D12_GP2_LP2_ptn_8, <5, 3>, <11, 2>, <18, 3>, <21, 3>, <27, 3>, <37, 3>, <49, 3>, <57, 3>, <63, 3>, <65, 2>, <76, 3>, <84, 3>, <96, 3>, <104, 3>, <110, 3>, <113, 3>]
[24, LRC_D12_GP2_LP2_ptn_9, <6, 3>, <13, 3>, <36, 3>, <40, 3>, <43, 3>, <52, 3>, <61, 3>, <66, 3>, <68, 3>, <89, 3>, <92, 3>, <93, 2>, <94, 3>, <98, 3>, <102, 3>, <118, 2>]
[25, LRC_D12_GP2_LP2_ptn_10, <1, 2>, <14, 3>, <16, 3>, <19, 1>, <28, 3>, <34, 3>, <42, 3>, <50, 3>, <56, 1>, <59, 3>, <67, 3>, <70, 2>, <88, 3>, <105, 2>, <115, 3>, <117, 2>]
[26, LRC_D12_GP2_LP2_ptn_11, <3, 3>, <10, 2>, <22, 3>, <44, 3>, <45, 3>, <46, 2>, <51, 3>, <54, 3>, <72, 2>, <75, 3>, <77, 3>, <78, 3>, <82, 3>, <86, 3>, <116, 3>, <119, 3>]
[27, LRC_D12_GP2_LP2_ptn_12, <2, 3>, <9, 2>, <24, 3>, <26, 3>, <31, 3>, <32, 3>, <53, 3>, <60, 3>, <69, 3>, <83, 3>, <85, 2>, <95, 3>, <97, 3>, <101, 2>, <107, 3>, <111, 3>]
[28, LRC_D12_GP2_LP2_ptn_13, <7, 3>, <25, 3>, <37, 4>, <38, 4>, <39, 4>, <49, 4>, <51, 4>, <61, 4>, <64, 4>, <75, 4>, <103, 4>, <111, 4>, <112, 4>, <113, 4>, <118, 3>, <119, 4>]
[29, LRC_D12_GP2_LP2_ptn_14, <4, 4>, <6, 4>, <18, 4>, <23, 4>, <24, 4>, <36, 4>, <48, 4>, <63, 4>, <66, 4>, <78, 4>, <79, 4>, <89, 4>, <97, 4>, <104, 4>, <109, 2>, <116, 4>]
[30, LRC_D12_GP2_LP2_ptn_15, <13, 4>, <15, 4>, <40, 4>, <42, 4>, <56, 2>, <60, 4>, <69, 4>, <71, 3>, <76, 4>, <77, 4>, <81, 4>, <83, 4>, <85, 3>, <88, 4>, <92, 4>, <105, 3>]
[31, LRC_D12_GP2_LP2_ptn_16, <9, 3>, <10, 3>, <28, 4>, <34, 4>, <41, 4>, <52, 4>, <53, 4>, <55, 3>, <59, 4>, <67, 4>, <74, 4>, <94, 4>, <100, 3>, <110, 4>, <115, 4>, <117, 3>]
[32, LRC_D12_GP2_LP2_ptn_1, <0, 4>, <2, 4>, <8, 3>, <11, 3>, <14, 4>, <19, 2>, <20, 4>, <21, 4>, <27, 4>, <29, 4>, <30, 3>, <31, 4>, <32, 4>, <44, 4>, <62, 4>, <102, 4>]
[33, LRC_D12_GP2_LP2_ptn_2, <1, 3>, <5, 4>, <33, 3>, <43, 4>, <50, 4>, <57, 4>, <58, 4>, <65, 3>, <68, 4>, <70, 3>, <72, 3>, <73, 3>, <87, 4>, <93, 3>, <106, 4>, <114, 4>]
[34, LRC_D12_GP2_LP2_ptn_3, <12, 3>, <16, 4>, <17, 4>, <22, 4>, <45, 4>, <54, 4>, <80, 4>, <84, 4>, <86, 4>, <90, 3>, <95, 4>, <96, 4>, <98, 4>, <101, 3>, <107, 4>, <108, 4>]
[35, LRC_D12_GP2_LP2_ptn_4, <8, 4>, <24, 5>, <34, 5>, <35, 4>, <42, 5>, <45, 5>, <52, 5>, <71, 4>, <72, 4>, <77, 5>, <81, 5>, <91, 4>, <98, 5>, <104, 5>, <109, 3>, <119, 5>]
[36, LRC_D12_GP2_LP2_ptn_5, <15, 5>, <22, 5>, <39, 5>, <47, 3>, <48, 5>, <49, 5>, <50, 5>, <51, 5>, <60, 5>, <65, 4>, <69, 5>, <73, 4>, <74, 5>, <88, 5>, <90, 4>, <105, 4>]
[37, LRC_D12_GP2_LP2_ptn_6, <44, 5>, <54, 5>, <59, 5>, <64, 5>, <68, 5>, <89, 5>, <93, 4>, <94, 5>, <95, 5>, <96, 5>, <102, 5>, <103, 5>, <107, 5>, <114, 5>, <115, 5>, <116, 5>]
[38, LRC_D12_GP2_LP2_ptn_7, <1, 4>, <12, 4>, <13, 5>, <16, 5>, <37, 5>, <40, 5>, <46, 3>, <55, 4>, <57, 5>, <58, 5>, <61, 5>, <66, 5>, <76, 5>, <87, 5>, <100, 4>, <111, 5>]
[39, LRC_D12_GP2_LP2_ptn_8, <4, 5>, <10, 4>, <18, 5>, <21, 5>, <23, 5>, <25, 4>, <26, 4>, <31, 5>, <33, 4>, <41, 5>, <43, 5>, <53, 5>, <67, 5>, <75, 5>, <97, 5>, <106, 5>]

[40, LRC_D12_GP2_LP2_ptn_9, <3, 4>, <5, 5>, <14, 5>, <19, 3>, <20, 5>, <27, 5>, <30, 4>, <38, 5>, <56, 3>, <79, 5>, <80, 5>, <86, 5>, <99, 4>, <112, 5>, <117, 4>, <118, 4>]

[41, LRC_D12_GP2_LP2_ptn_10, <0, 5>, <2, 5>, <6, 5>, <9, 4>, <17, 5>, <28, 5>, <32, 5>, <36, 5>, <62, 5>, <63, 5>, <78, 5>, <82, 4>, <83, 5>, <85, 4>, <101, 4>, <108, 5>]
[42, LRC_D12_GP2_LP2_ptn_11, <2, 6>, <21, 6>, <23, 6>, <25, 5>, <35, 5>, <37, 6>, <41, 6>, <42, 6>, <51, 6>, <52, 6>, <63, 6>, <75, 6>, <76, 6>, <77, 6>, <95, 6>, <103, 6>]
[43, LRC_D12_GP2_LP2_ptn_12, <0, 6>, <5, 6>, <11, 4>, <18, 6>, <28, 6>, <31, 6>, <46, 4>, <68, 6>, <69, 6>, <81, 6>, <83, 6>, <84, 5>, <111, 6>, <113, 5>, <117, 5>, <119, 6>]
[44, LRC_D12_GP2_LP2_ptn_13, <6, 6>, <15, 6>, <17, 6>, <19, 4>, <22, 6>, <27, 6>, <34, 6>, <36, 6>, <49, 6>, <59, 6>, <91, 5>, <102, 6>, <105, 5>, <108, 6>, <114, 6>, <115, 6>]
[45, LRC_D12_GP2_LP2_ptn_14, <1, 5>, <4, 6>, <9, 5>, <24, 6>, <29, 5>, <30, 5>, <33, 5>, <48, 6>, <62, 6>, <65, 5>, <86, 6>, <96, 6>, <97, 6>, <101, 5>, <106, 6>, <118, 5>]
[46, LRC_D12_GP2_LP2_ptn_15, <3, 5>, <14, 6>, <16, 6>, <38, 6>, <45, 6>, <54, 6>, <55, 5>, <61, 6>, <66, 6>, <70, 4>, <71, 5>, <89, 6>, <99, 5>, <107, 6>, <110, 5>, <116, 6>]

[47, LRC_D12_GP2_LP2_ptn_16, <8, 5>, <13, 6>, <40, 6>, <53, 6>, <56, 4>, <57, 6>, <60, 6>, <74, 6>, <80, 6>, <82, 5>, <85, 5>, <87, 6>, <90, 5>, <92, 5>, <98, 6>, <109, 4>]
[48, LRC_D12_GP2_LP2_ptn_1, <12, 5>, <39, 6>, <43, 6>, <47, 4>, <50, 6>, <58, 6>, <64, 6>, <67, 6>, <72, 5>, <73, 5>, <78, 6>, <88, 6>, <94, 6>, <100, 5>, <104, 6>, <112, 6>]
[49, LRC_D12_GP2_LP2_ptn_2, <0, 7>, <10, 5>, <19, 5>, <24, 7>, <28, 7>, <30, 6>, <31, 7>, <36, 7>, <40, 7>, <53, 7>, <64, 7>, <90, 6>, <91, 6>, <103, 7>, <107, 7>, <119, 7>]
[50, LRC_D12_GP2_LP2_ptn_3, <12, 6>, <29, 6>, <38, 7>, <39, 7>, <41, 7>, <42, 7>, <43, 7>, <51, 7>, <52, 7>, <58, 7>, <61, 7>, <70, 5>, <72, 6>, <109, 5>, <110, 6>, <115, 7>]
[51, LRC_D12_GP2_LP2_ptn_4, <2, 7>, <13, 7>, <18, 7>, <25, 6>, <44, 6>, <45, 7>, <46, 5>, <47, 5>, <57, 7>, <62, 7>, <77, 7>, <82, 6>, <92, 6>, <93, 5>, <98, 7>, <106, 7>]
[52, LRC_D12_GP2_LP2_ptn_5, <5, 7>, <8, 6>, <17, 7>, <21, 7>, <22, 7>, <32, 6>, <63, 7>, <66, 7>, <68, 7>, <71, 6>, <75, 7>, <81, 7>, <84, 6>, <85, 6>, <88, 7>, <89, 7>]
[53, LRC_D12_GP2_LP2_ptn_6, <3, 6>, <15, 7>, <23, 7>, <35, 6>, <50, 7>, <56, 5>, <59, 7>, <69, 7>, <78, 7>, <80, 7>, <83, 7>, <86, 7>, <97, 7>, <105, 6>, <113, 6>, <117, 6>]
[54, LRC_D12_GP2_LP2_ptn_7, <6, 7>, <9, 6>, <20, 6>, <27, 7>, <33, 6>, <34, 7>, <37, 7>, <49, 7>, <55, 6>, <65, 6>, <76, 7>, <94, 7>, <104, 7>, <111, 7>, <114, 7>, <118, 6>]
[55, LRC_D12_GP2_LP2_ptn_8, <1, 6>, <7, 4>, <14, 7>, <16, 7>, <26, 5>, <48, 7>, <73, 6>, <74, 7>, <79, 6>, <87, 7>, <99, 6>, <100, 6>, <101, 6>, <102, 7>, <108, 7>, <112, 7>]
[56, LRC_D12_GP2_LP2_ptn_9, <2, 8>, <10, 6>, <22, 8>, <38, 8>, <47, 6>, <48, 8>, <62, 8>, <65, 7>, <71, 7>, <86, 8>, <88, 8>, <91, 7>, <93, 6>, <100, 7>, <103, 8>, <104, 8>]
[57, LRC_D12_GP2_LP2_ptn_10, <8, 7>, <9, 7>, <14, 8>, <19, 6>, <21, 8>, <43, 8>, <50, 8>, <56, 6>, <58, 8>, <60, 7>, <64, 8>, <81, 8>, <83, 8>, <101, 7>, <102, 8>, <116, 7>]
[58, LRC_D12_GP2_LP2_ptn_11, <4, 7>, <6, 8>, <28, 8>, <30, 7>, <41, 8>, <46, 6>, <52, 8>, <61, 8>, <67, 7>, <69, 8>, <76, 8>, <80, 8>, <107, 8>, <108, 8>, <114, 8>, <117, 7>]
[59, LRC_D12_GP2_LP2_ptn_12, <3, 7>, <5, 8>, <7, 5>, <17, 8>, <18, 8>, <27, 8>, <34, 8>, <37, 8>, <49, 8>, <55, 7>, <78, 8>, <79, 7>, <82, 7>, <87, 8>, <96, 7>, <119, 8>]
[60, LRC_D12_GP2_LP2_ptn_13, <12, 7>, <24, 8>, <26, 6>, <35, 7>, <40, 8>, <44, 7>, <45, 8>, <63, 8>, <68, 8>, <70, 6>, <77, 8>, <99, 7>, <105, 7>, <111, 8>, <115, 8>, <118, 7>]
[61, LRC_D12_GP2_LP2_ptn_14, <1, 7>, <16, 8>, <20, 7>, <23, 8>, <25, 7>, <32, 7>, <51, 8>, <54, 7>, <66, 8>, <73, 7>, <74, 8>, <84, 7>, <89, 8>, <94, 8>, <95, 7>, <113, 7>]
[62, LRC_D12_GP2_LP2_ptn_15, <0, 8>, <11, 5>, <13, 8>, <15, 8>, <29, 7>, <31, 8>, <33, 7>, <39, 8>, <53, 8>, <59, 8>, <72, 7>, <75, 8>, <92, 7>, <97, 8>, <98, 8>, <106, 8>]
[63, LRC_D12_GP2_LP2_ptn_16, <7, 6>, <17, 9>, <22, 9>, <26, 7>, <40, 9>, <42, 8>, <46, 7>, <47, 7>, <57, 8>, <59, 9>, <66, 9>, <74, 9>, <97, 9>, <106, 9>, <114, 9>, <116, 8>]
. . .

What is claimed is:
1. A method of storing data and parity information in a declustered array of storage devices, the method comprising:
receiving an erasure scheme for distributing data and parity in the declustered array of storage devices, wherein each storage device is partitioned into a plurality of stripes, and wherein each stripe is configured to store data, parity information or is reserved for data recovery as a hot spare stripe;
determining a balanced incomplete block design mapping compatible with the number of storage devices in the declustered array of storage devices and the erasure scheme;
grouping subsets of stripes into a plurality of chunk groups based on the balanced incomplete block design mapping, wherein each chunk group comprises stripes from different storage devices; and
storing information representative of the erasure scheme and chunk groups within a multi-level table comprising:
at least a first-level erasure scheme pattern table, and
at least a second-level chunk group lookup table, and
storing data and parity information in at least a subset of the plurality of stripes in accordance with the multi-level table;
wherein the method is performed under control of at least one array controller.
2. The method of claim 1, wherein determining the balanced incomplete block design mapping further comprises:
generating a first K-by-K matrix comprising entries that are a random permutation of integers 1 through N, wherein N is the number of said storage devices within the declustered array of storage devices and K is the number of data and parity stripes associated with said received erasure scheme and N is equal to K squared;
generating a second matrix that is a transpose of the first matrix;
generating K−1 square matrices, wherein each of said K−1 square matrices is formed by performing successive rotational operations on the first matrix; and
generating the balanced incomplete block design mapping wherein each chunk group is defined by a row of each square matrix generated.
3. The method of claim 1,
wherein the first-level erasure scheme pattern table comprises entries for select permutations of data and parity stripes according to the erasure scheme, and
wherein the second-level chunk group lookup table comprises entries defining chunk groups, each chunk group comprising a plurality of data and parity stripes, wherein each stripe of each chunk group is located on a different storage device, and wherein the chunk group lookup table entries further identify an erasure scheme pattern defined in the erasure scheme pattern table.
4. The method of claim 3,
wherein the select permutations of data and parity stripes are a left-symmetric one-round rotation of data and parity stripes;
and wherein each storage device is labeled with an identification number;
and wherein the entries of the second-level chunk group lookup table are arranged such that the storage device identification numbers within each entry are monotonically increasing.

5. The method of claim 1, further comprising recovering data stored in a failed storage device by:
- determining a set of chunk groups that includes one or more stripes located in the failed storage device;
- reading data and parity stored in the other stripes associated with the set of chunk groups;
- reconstructing data and parity stored in the one or more stripes located on the failed storage device based on the erasure scheme; and
- storing the reconstructed data and parity in at least a subset of the plurality of hot spare stripes reserved for data recovery.

6. The method of claim 1, further comprising recovering data stored in a failed storage device by:
- determining a set of chunk groups that includes one or more stripes located in the failed storage device;
- connecting a new storage device to the declustered array of storage devices, wherein the new storage device is partitioned into stripes of the same size as stripes in the other storage devices;
- reading data and parity from the other stripes associated with the set of chunk groups;
- reconstructing data and parity stored in the one or more stripes located on the failed storage device based on the erasure scheme;
- storing the reconstructed data and parity in at least a subset of a plurality of stripes on the new storage device.

7. The method of claim 1, wherein the number of data and parity stripes in each chunk group is a prime number greater than or equal to 3.

8. The method of claim 1, wherein the hot spare stripes that are reserved for data recovery are evenly distributed throughout the array of storage devices.

9. The method of claim 1 wherein the erasure scheme is selected from a group consisting of a RAID scheme, a Reed-Solomon code, and a Local Reconstruction Code.

10. A method of storing data and parity information in a declustered array of storage devices comprising:
- receiving an erasure scheme for distributing data and parity in the declustered array of storage devices, wherein each storage device is partitioned into a plurality of stripes, and wherein each stripe is configured to store data, parity information or is reserved for data recovery as a hot spare stripe;
- determining a partial balanced incomplete block design mapping compatible with the number of storage devices in the declustered array of storage devices and the erasure scheme;
- grouping subsets of stripes into a plurality of chunk groups based on the partial balanced incomplete block design mapping, wherein each chunk group comprises stripes from different storage devices; and
- storing information representative of the erasure scheme and chunk groups within a multi-level table comprising:
  - at least a first-level erasure scheme pattern table, and
  - at least a second-level chunk group lookup table, and
- storing data and parity information in at least a subset of the plurality of stripes in accordance with the multi-level table;
- wherein the method is performed under control of at least one array controller.

11. The method of claim 10, wherein determining the partial balanced incomplete block design further comprises:
- defining an integer D equal to the floor of N divided by K, wherein N is the number of storage devices in the declustered array of storage devices and K is the number of stripes associated with each chunk group;
- initializing a chunk group list to hold chunk group mappings; and
- iteratively adding chunk group mappings to the chunk group list by:
  - generating a 1 by N array consisting of a random permutation of the numbers 1 through N,
  - dividing the array into D subarrays of K elements each and discarding any remaining elements,
  - appending the D subarrays to said chunk group list, wherein the D subarrays define chunk group mappings, and
  - ending the iteratively adding if the number of times each storage device appears with every other storage device in a chunk group is at least 1 for every pair of storage devices.

12. The method of claim 11, wherein iteratively adding chunk group mappings to the chunk group list further comprises:
- determining a utilization ratio of the storage devices; and
- ending the iteratively adding if the number of times each storage device appears with every other storage device in a chunk group is at least 1 and the utilization ratio is at least 90 percent.

13. The method of claim 10,
- wherein the first-level erasure scheme pattern table comprises entries for select permutations of data and parity stripes according to the erasure scheme, and
- wherein the second-level chunk group lookup table comprises entries defining chunk groups, each chunk group comprising a plurality of data and parity stripes, wherein each stripe of each chunk group is located on a different storage device, and wherein the chunk group lookup table entries further identify an erasure scheme pattern defined in the erasure scheme pattern table.

14. The method of claim 13,
- wherein the select permutations of data and parity stripes are a left-symmetric one-round rotation of data and parity stripes;
- and wherein each storage device is labeled with an identification number;
- and wherein the entries of the second-level chunk group lookup table are arranged such that the storage device identification numbers within each entry are monotonically increasing.

15. The method of claim 10, further comprising recovering data and parity from a failed storage device by:
- determining a set of chunk groups that includes one or more stripes located in the failed storage device;
- reading data and parity stored in the other stripes associated with the set of chunk groups;
- reconstructing data and parity stored in the one or more stripes based on the erasure scheme; and
- storing the reconstructed data and parity in at least a subset of the plurality of hot spare stripes reserved for data recovery.

16. The method of claim 10, further comprising repairing a storage device that has failed, the repairing comprising:
- determining which storage device has failed;
- connecting a new storage device to the declustered array of storage devices, wherein the new storage device is partitioned into stripes of the same size as stripes in the other storage devices;
- determining which chunk groups are affected by the storage device failure;

reading data and parity from the other stripes contained in said affected chunk groups, reconstructing the information on each stripe of said failed storage device based on the erasure coding scheme, and writing the reconstructed information to at least a subset of a plurality of stripes on the new storage device.

17. The method of claim 10, wherein the hot spare stripes that are reserved for data recovery are evenly distributed among the array of storage devices.

18. The method of claim 10 wherein the erasure scheme is selected from a group consisting of a RAID scheme, a Reed-Solomon code, and a Local Reconstruction Code.

19. A declustered, fault-tolerant array of storage devices comprising:

a plurality of storage devices, wherein each storage device is partitioned into a plurality of stripes, each stripe capable of storing data, parity information or is reserved for data recovery as a hot spare stripe; and at least one array controller connected to said plurality of storage devices, the at least one array controller configured to store data and parity in the plurality of stripes according to a multi-level mapping table, wherein at least a first level of the table is an erasure scheme pattern table comprising entries for select permutations of data and parity stripes according to an erasure scheme, and wherein at least a second level of the table is a chunk group lookup table comprising entries defining chunk groups, each comprising a plurality of data and parity stripes, wherein each stripe of each chunk group is located on a different storage device, and wherein the chunk group lookup table entries further identify an erasure scheme pattern defined in the erasure scheme pattern table.

20. The declustered, fault-tolerant array of storage devices of claim 19, wherein the array controller is further configured to generate the multi-level mapping table based on a balanced incomplete block design or a partial balanced incomplete block design.

21. The declustered, fault-tolerant array of storage devices of claim 19, wherein the erasure scheme is selected from the group consisting of a RAID scheme, a Reed-Solomon code, and a Local Reconstruction Code.

22. The declustered, fault-tolerant array of storage devices of claim 19, wherein the hot spare stripes that are reserved for data recovery are evenly distributed among the plurality of storage devices.

* * * * *

UNITED STATES PATENT AND TRADEMARK OFFICE
CERTIFICATE OF CORRECTION

PATENT NO. : 9,841,908 B1
APPLICATION NO. : 15/198245
DATED : December 12, 2017
INVENTOR(S) : Zhengyi Zhao It is certified that error appears in the above-identified patent and that said Letters Patent is hereby corrected as shown below:

On the Title Page

In Column 1 (page 2, item (56)) at Line 24, Under Other Publications, change "gpfs.v4r1.gpfs200.doc/bl1adv_introdeclustered.htm." to --gpfs.v4r1.gpfs200.doc/bl1adv_introdeclustered.htm.--.

In the Specification

In Column 4 at Line 22, Change "$\lambda$," to --$\lambda$--.

In Column 11 at Line 10 (approx.), Change "BIM" to --BIBD--.

In Column 11 at Line 23 (approx.), Change "BIM" to --BIBD--.

In Column 12 at Line 14, Change "(5,1)→(1,2)→(2,3)→(4,5)=[11 7 25 4 10]" to --(5,1) → (1,2) → (2,3) → (3,4) → (4,5) = [11 7 25 4 10]--.

In Column 18 at Line 1, Change "RS_D10_P4_pt_2:" to --RS_D10_P4_ptn_2:--.

In Column 18 at Line 7, Change "RS_D10_P_pt_5:" to --RS_D10_P4_ptn_5:--.

In Column 18 at Line 15, Change "RS_D10_P4_9:" to --RS_D10_P4_ptn_9:--.

In Column 18 at Line 17, Change "RS_D10_P4_10:" to --RS_D10_P4_ptn_10:--.

Signed and Sealed this
Fourth Day of June, 2019

Andrei Iancu
*Director of the United States Patent and Trademark Office*